(12) United States Patent
Hmidi et al.

(10) Patent No.: US 11,759,767 B2
(45) Date of Patent: Sep. 19, 2023

(54) ADSORBENT COMPOSITION, METHOD OF MAKING THE SAME, AND USES THEREOF

(71) Applicant: Goldcorp Inc., Greenwood Village, CO (US)

(72) Inventors: Nuri Belgasem Ali Hmidi, Vancouver (CA); Eduard Guerra, Sudbury (CA)

(73) Assignee: Goldcorp Inc., Denver, CO (US)

( * ) Notice: Subject to any disclaimer, the term of this patent is extended or adjusted under 35 U.S.C. 154(b) by 803 days.

(21) Appl. No.: 16/098,638

(22) PCT Filed: May 5, 2017

(86) PCT No.: PCT/CA2017/050549
§ 371 (c)(1),
(2) Date: Nov. 2, 2018

(87) PCT Pub. No.: WO2017/190251
PCT Pub. Date: Nov. 9, 2017

(65) Prior Publication Data
US 2019/0143303 A1 May 16, 2019

Related U.S. Application Data

(60) Provisional application No. 62/332,807, filed on May 6, 2016.

(51) Int. Cl.
| | | |
|---|---|---|
| *B01J 20/32* | (2006.01) | |
| *B01J 20/26* | (2006.01) | |
| *B01J 20/28* | (2006.01) | |
| *B01J 20/30* | (2006.01) | |
| *C22B 3/00* | (2006.01) | |
| *C22B 11/00* | (2006.01) | |
| *B01J 20/02* | (2006.01) | |
| *C22B 3/24* | (2006.01) | |
| *C22B 3/42* | (2006.01) | |

(52) U.S. Cl.
CPC ........... *B01J 20/321* (2013.01); *B01J 20/02* (2013.01); *B01J 20/26* (2013.01); *B01J 20/261* (2013.01); *B01J 20/2803* (2013.01); *B01J 20/28004* (2013.01); *B01J 20/2808* (2013.01); *B01J 20/28059* (2013.01); *B01J 20/28061* (2013.01); *B01J 20/28064* (2013.01); *B01J 20/28066* (2013.01); *B01J 20/30* (2013.01); *B01J 20/3078* (2013.01); *B01J 20/324* (2013.01); *B01J 20/3208* (2013.01); *B01J 20/3236* (2013.01); *B01J 20/3238* (2013.01); *C22B 3/24* (2013.01); *C22B 3/42* (2013.01); *C22B 11/04* (2013.01); *Y02P 10/20* (2015.11)

(58) Field of Classification Search
CPC .. B01J 20/321; B01J 20/261; B01J 20/28004; C22B 3/24; C22B 11/04
See application file for complete search history.

(56) References Cited

U.S. PATENT DOCUMENTS

| | | | |
|---|---|---|---|
| 2,987,774 A * | 6/1961 | Jacobson | C08J 9/12 264/53 |
| 4,216,073 A | 8/1980 | Goldstein | |
| 4,348,374 A | 9/1982 | Chau | |
| 4,828,955 A | 5/1989 | Kasai et al. | |
| 5,098,577 A | 3/1992 | McLaughlin et al. | |
| 5,210,113 A | 5/1993 | Waters | |
| 5,695,882 A | 12/1997 | Rosenberg | |
| 5,879,757 A | 3/1999 | Gutowski et al. | |
| 6,045,700 A | 4/2000 | Heitkamp et al. | |
| 6,284,021 B1 | 9/2001 | Lu et al. | |
| 8,053,019 B2 | 11/2011 | Hossainy et al. | |
| 2003/0153457 A1 * | 8/2003 | Nemoto | B01J 20/262 502/402 |
| 2008/0017036 A1 | 1/2008 | Schultink et al. | |
| 2014/0017309 A1 | 1/2014 | Kellum et al. | |
| 2014/0335344 A1 | 11/2014 | Care | |
| 2014/0342233 A1 | 11/2014 | Guo et al. | |
| 2015/0090075 A1 | 4/2015 | Dedek et al. | |
| 2015/0190781 A1 | 7/2015 | Hanamoto et al. | |

FOREIGN PATENT DOCUMENTS

| | | | | |
|---|---|---|---|---|
| CA | 2187490 A1 | 5/1997 | | |
| CA | 2285307 A1 | 11/1998 | | |
| CA | 2442778 A1 | 12/2002 | | |
| CN | 1925776 A | 3/2007 | | |
| DE | 2829814 A2 | 3/1979 | | |
| EP | 1486530 A1 * | 12/2004 | ............ | C08J 9/0066 |

(Continued)

OTHER PUBLICATIONS

Koysuren et al., J. App. Poly. Sci., (2007), v104, p. 3427-3433.*
AU Examination Report for Application No. 2017260708, dated May 18, 2021, 5 pages.
McDougall, Gloria J. and Hancock, Robert D., Gold Complexes and Activated Carbon, Gold Bull., 1981, pp. 138-152,14, (4).
First Office Action for Application No. 201780042038.7, dated Apr. 21, 2021, Issue Serial No. 2021041601982850, 38 pages.
Process Analytical Systems (Pty) Ltd.; "TAC 1000 Cyanide & pH Analyzer & Controller"; http://www.process-analytical.co.za/prod04.html; printed on Apr. 2, 2019—(4) pages.

(Continued)

*Primary Examiner* — Yong L Chu
(74) *Attorney, Agent, or Firm* — Boyle Fredrickson, S.C.

(57) ABSTRACT

An adsorbent composition comprising particles consisting of a core which is at least partially coated with an adsorbent material is disclosed. The core is selected so that it has at least one of: (i) wear resistance; (ii) resistance to corrosive conditions; (iii) at least one thermoplastic material; and (iv) a low porosity. A suitable core material is polystyrene. Adsorbent materials suitable for the coating include activated carbon and metal oxides such as silica and alumina. The adsorbent composition may be used for the adsorption of metals and metal ions in ore processing, for instance for the separation of precious metals such as gold.

70 Claims, 17 Drawing Sheets

(56) References Cited

FOREIGN PATENT DOCUMENTS

| | | | |
|---|---|---|---|
| FR | 2794993 A1 | 12/2000 | |
| GB | 1138473 * | 1/1969 | ............... C08F 47/10 |
| GB | 1138473 A * | 1/1969 | ......... B29C 47/1054 |
| GB | 1138473 A | 1/1969 | |
| KR | 2014013312 | 9/2014 | |
| RU | 2416572 C2 | 4/2011 | |
| RU | 2554642 C2 | 6/2015 | |

OTHER PUBLICATIONS

ELE International; Digital Tritest 50 25-3518 Apr. 30, 2003; "Operating Instructions"; https://www.ele.com/Product/digital-tritest-50-load-frame-110-120vac—(21) pages.

ELE International; Digital Tritest 50 Load Frame; "Product Sheet"; https://www.ele.com/Product/digital-tritest-50-load-frame-110-120vac—(7) pages.

J. Marsden and I. House; "The Chemistry of Gold Extraction"; Ellis Horwood Series in Metals and Associated Materials 1992, pp. 360-364—(8) pages.

Adams, M. D.; Nicol, M. J.—The Kinetics of the Elution of Gold from Active Carbon, Gold 100: Proc. Int. Conf. on of Mining and Metallurgy, Johannesburg, South Africa, (1986).

Ali, M. F.; Budari, N. M.; Imran, S. N. M.; Omar, S. M.—Effectiveness of Burnt Oil Palm Shell Filter Media for the Removal of Physical Contaminants in Water Treatment Process; International Conference on Agricultural and Food Engineering for Life, 26-28, Nov. 2012.

Akram, Aurangzeb; Stuckey, David C.—Flux and Performance Improvement in a Submerged Anaerobic Membrane Bioreactor (SAMBR) Using Powdered Activated Carbon (PAC); Process Biochemistry 43 93-102, (2008).

BaÅŸar, C. A.—Applicability of the Various Adsorption Models of Three Dyes Adsorption onto Activated Carbon Prepared Waste Apricot, J Hazard Mater 135: 232-241, (2006).

Bailey, P.R.; Davidson, R.; Johannsen, S.; Holtum, D.—The Extractive Metallurgy of Gold in South Africa, vol. 1, Stanley, G.G., Ed.; South African Institute of Mining and Metallurgy, Johannesburg, (2001); pp. 482-485.

Banini, G. A.—Modeling of the Elution Process, Msc Thesis, Wits University, Johannesburg, South Africa, (1993).

Basualto, C. et al.,—Lanthandie Sorbent Based on Magnetite Nanoparticles Functionalized with Organophophorus Extractions, Sci. Technol. Adv. Mater., Jun. 25, 2015 (Jun. 25, 2015), vol. 16, pp. 1-9.

Blanco, L. J. L.; Meseguer, L. J.; Zapata V.F.; De Juan Garcia, D.—Statistical Analysis of Laboratory Results of Zn Wastes Leaching, Hydrometallurgy, 54 (1), p. 41, (1999).

Chehreh Chelgani, S.; Hart, B.; Xia, L.—A TOF-SIMS Surface Chemical Analytical Study of Rare Earth Element Minerals from Micro-Flotation Tests Products, Minerals Engineering, 45, 32-40, (2013).

Chemrak, M.A.; Benderdouche, N.; Bestani, B.—Removal of Mercury from Natural Gas by a New Activated Adsorbent from Olive Stones, Canadian Journal of Chemical Eng., (2017) vol. 9999pp. 1-9.

Chern, C. S.—Emulsion Polymerization Mechanisms and Kinetics, Prog. Polym. Sci. 31, pp. 443-486, (2006).

Cho, E.H.; Dixon, S. N.; Pitt, C. H.—The Kinetics of Gold Cyanide Adsorption on Activated Charcoal, Metallurgical and Materials Transactions B, (1979), 10.

Chung, D.D.L., Applied Materials Science, 2001, Ch. 8, pp. 109-115.

Cortina J. L.; Warshawsky A.; Kahana N.; Kampel V.; Sampaio C. H.; Kautzmann R. M.—Kinetics of Goldcyanide Extraction Using Ion-Exchange Resins Containing Piperazine Functionality, Reactive and Functional Polymers, (2003).

Day, A.G.—Journal of the Oil and Colour Chemists' Association, 38, pp. 782-793, (1955).

Dayton. S.—Gold Processing Update, Engineering and Mining Journal, (1987).

Dipa Das; Debi Prasad; and Meikap, B.C.—Preparation of Activated Carbon from Green Coconut Shell and its Characterization; Journal of Chemical Engineering & Process Technology, Sep. 30, 2015.

Dubinin, M. M.—Micropore Structures of Charcoal Adsorbents, 1. A General Characterization of Micro-and Supermicropores in the Fissure Model; Russian Chemical Bulletin; August, vol. 28, Issue 8, pp. 1560-1564, (1979).

Eder K.; Buchmeiser, M. R.; Bonn, G. K.—New Cation Exchange Resins with High Reversed-Phase-Character for Solid-Phase Extraction of Phenols, Journal of Chromatography A, (1998), 810.

Fleming, C. C.; Cromberge, G.—The Extraction of Gold from Cyanide Solutions by Strong-and Weak-Base Anion-Exchange Resins, J.S. Afr. Inst. Min. Metall., (198)4, 84.

Gaillard, C.; Camps, M.; Proust, J. P.; Hashieh, I. A.; Rolland, P.; Bois, A.—Copolymerization of 1,2 bis(2-methyl propenoyloxy)ethane and divinylbenzene in a aqueous suspension. Part I : control of the diameters of the beads of 1,2 bis(2-methyl propenoyioxy)ethane-divinylbenzene copolymer, Polymer, (2000), 41.

Garg, V. K.; Gupta R.; Bala Yadav A.; Kumar, R. Dye—Removal from Aqueous Solution by Adsorption on Treated Sawdust, Bioresour Technol 89: 121-124, (2003).

Gomes, C. P.; Almeida, M. F.; Loureiro, J. M.—Gold Recovery With Ion Exchange Used Resins, Separation and Purification Technology, (2001), 24.

Halet, F.; Yeddou, A. R.; Chergui, A.; Chergui, S.; Nadjemi. B; Ould-Dris, A.—Removal of Cyanide from Aqueous Solutions by Adsorption on Activated Carbon Prepared from Lignocellulosic By-Products, Journal of Dispersion Science and Technology, vol. 36, pp. 1736-1741, (2015).

Hayes, P.—Process Principles in Minerals and Materials Production, 3rd Ed. Hayes Publishing Company, Sherwood, Australia, p. 260, (2003).

Holboke, A. E.; Pinnell, R. P.—Preparation and Characterization of an Ion Exchange Resin in the Organic Laboratory, Sulfonation of Polystyrene, vol. 66, No. 7, pp. 613-614 (1989).

Ibrado, A. S.; Fuerstenau, D. W.—Adsorption of the Cyano Complexes of Ag(I), Cu(I), Hg(II), Cd(II) and Zn(II) on Activated Carbon, Minerals & Metallurgical Processing, (1989), 6, 0747-9182.

Imhof, Arnout—Preparation and Characterization of Titania-Coated Polystyrene Spheres and Hollow Titania Shells; Langmuir, 17 (12), pp. 3579-3585, (2001).

Laboratory Mixing Extruder (LME). http://www.dynisco.com.

Letourneur, D.; Migonney, V.; Muller, D.—Phosphorylated Polystyrene Resins in High Performance Ion-Exchange, J. Chromatography, (1992), 589.

Liebenberg, S.P ; Van Deventer, J. S. J.—Evaluating a Dynamic Model for the Competitive Elution of Gold and Base Metals from Activated Carbon, Separation Science and Technology, (1997), 32.

Lin, H. K.; Hill, E. M.; Oleson, J. L.—Recovering Gold From Carbon Fines by a Gold Transfer Process, Mineral & Metallurgical Processing, (2003), 20.

Lukey, G. C.; Van Deventer, J. S. J.; Shallcross, D.C.—The Effect of Functional Group Structure on the Elution of Metal Cyanide Complexes From Ion-Exchange Resins, Separation Science and Technology, (2000), 35.

Lukey, G. C.; van Deventer, J. S. J.; Shallcross, D.C.—Equilibrium Model for the Selective Sorption of Gold Cyanide on Different Ion-Exchange Functional Groups, Minerals Engineering, vol. 13, Issue 12, pp. 1243-1261, Oct. 2000.

Lunga, A. L.—Optimizing the Operating Conditions of Gold Elution and Electrowinning for Tau Lekoa Stream at Kopanang Gold Plant, M.S. Thesis, University of the Witwatersrand Johannesburg, (2006).

Marsden, J.; House, I.—The Chemistry of Gold Extraction, 2nd ed.; The Society for Mining, Metallurgy and Exploration, Inc. (2006).

Martin, O.; Hild, S.—Temperature-Dependent Surface Properties of Thin Polystyrene Films Determined by Scanning Force Microscopy, American Chemical Society, (1999) 741, pp. 212-226.

(56) References Cited

OTHER PUBLICATIONS

McCaffery, Edward M.—Laboratory Preparation for Macromolecular Chemistry, (1963).

Md Shariful Islami; Bee Chin Ang; Samira Gharehkhani; Amalina Binti Muhammad Afifi—Adsorption Capability of Activated Carbon Synthesized from Coconut Shell; Carbon Letters vol. 20, 1-9 (2016).

Michaelis, H—Recovering Gold and Silver From Pregnant Leach Solution, Zinc Dust, Carbon Handling and Regeneration, and Ion Exchange, Engineering and Mining Journal, (1987), pp. 50-55.

Montgomery, D.C.—Design and Analysis of Experiments, 4th ed. New York: Wiley, (1997).

Sole, Kathryn C.; Peihao, Qi; Brent Hiskey, J—An Evaluation of the Physicochemical Degradation of Gold Ion-Exchange Resins in Hypochlorite Solutions, Metallurgical Transactions B, (1993), vol. 24, pp. 17-25.

Ottewill, R. H.; Schofield, A. B.; Waters, J. A.—Surface Tension, Stickiness, and Engulfment, J. Dispersion Science and Technology 19 (6&7) 1151-1 162, (1998).

Patrick, J. W. (ed.)—Porosity in Carbons: Characterization and Applications, Book, Illustrated edition: New York: Halsted Press, c (1995).

Qiu, G.; Guo, M.—Quality of Poultry Litter-Derived Granular Activated Carbon, BioSource Technology, 101, pp. 379-386, (2010).

Ragan, Steve; Megonnell, Neal—Activated Carbon Renewable Resources—Lignin; Cellulose Chemistry and Technology, May 17, 2011.

Rieman, W. and Walton, H .F.—Ion Exchange in Analytical Chemistry, Elsevier, Chapter 1, pp. 9-14, (2013).

Riani, J. C.; Leão, V. A.; Silva, C. A.; Silva, A. M.; Bertolino S. M.; Lukey, G. C.—The Elution of Metal Cyanocomplexes from Polyacrylic—and Polystyrene-Based Ion Exchange Resins Using Nitrate and Thiocyanate Eluants, Braz. J. Chem. Eng., (2007), 24.

Roth, C. B.; Dutcher, J. R.—Glass Transition and Chain Mobility in Thin Polymer Films, Journal of Electroanalytical Chemistry, 584, pp. 13-22, (2005).

Office Action for Application No. 201780042038.7 dated Nov. 16, 2021, 34 pages.

Rossier, M. et al., "Gold Adsorption on the Carbon Surface of C/Co Nanoparticles Allows Magnetic Extraction from Extremely Diluted Aqueous Solutions". J. Mater. Chem., (Sep. 21, 2009), vol. 19, pp. 8239-8243.

Wang, Z. et al., "Preparing Microgranules from Waste Polystyrene through a Novel Temperature and Nonsolvent-Induced Phase Separation Method for Potential Adsorbent", Ind. Eng. Chem. Res., (Jan. 21, 2005), vol. 44, pp. 825-831.

Australian Examination Report dated Oct. 10, 2022; pp. 1-5.

Office Action for Application No. CA 3,021,143 dated Nov. 9, 2022, 3 pages.

Rossier, M. et al.,—Gold Adsorption on the Carbon Surface of C/Co Nanoparticles Allows Magnetic Extraction from Extremely Diluted Aqueous Solution, J. Mater. Chem., Sep. 21, 2009 (Sep. 21, 2009), vol. 19, pp. 8239-8243.

Rouquerol, F.; Rouquerol, J.; Sing, K.—Adsorption by Powders and Porous Solids, Principles, Methodology and Applications; Academic Press: London, UK, (1999).

Ruhmer, W. T.—In the Handbook on the Estimation of Metallurgical Process Costs, Mintek, Randburg, South Africa, (1992).

Sayan, E.; Bayramoglu, M.—Statistical Modeling and Optimization of Ultrasound-Assisted Sulfuric Acid Leaching of TiO2 From Red Mud, Hydrometallurgy, 71 (3-4), p. 397, (2004).

Shamsuddin, M. S.; Yusoff, N. R. N.; Sulaiman, M. A.—Synthesis and Characterization of Activated Carbon Produced from Kenaf Core Fiber Using H3PO4 Activation, Procedia Chemistry 19, 558-565, (2016).

Sherrington, D.C.—Preparation, Structure and Morphology of Polymer Supports, Chemical Communications, (1998), 21, 2275-2286.

Sing, K. S .W.; Everett, D. H.; Haul, R. A. W.; Moscou, L.; Pierotti, R. A.; Rouquerol, J.; Siemieniewska, T.—Reporting Physisorption Data for Gas/Solid Systems With Special Reference to the Determination of Surface Area and Porosity, Pure Appl. Chem. 54, 603-619, (1985).

Skubiszewska-Zieba, J.; Sydorchuk, V. V.; Gun'ko, V. M.; Leboda, R.—Hydrothermal Modification of Carbon Adsorbents; Adsorption, 17:919-927, Sep. 3, 2011.

Stange, W.—The Process Design of Gold Leaching and Carbon-in-Pulp Circuits, The Journal of the South African Institute of Mining and Metallurgy. (1999).

Sun, T. M.; Yen, W. T.—A Reactor Model for Gold Elution from Activated Carbon with Caustic Cyanide Solution, Canadian Metallurgical Quarterly, (1995), 34.

Tai, M. H.; Saha, B.; Streat, M.—Characterization and Sorption Performance of a Hypersol Macronet Polymer and an Activated Carbon, Reactive & Functional Polymers, (1999), 41(1), pp. 149-161.

Tirupathi Rao Penki; Shanmughasundaram, D.; Kishore, Brij; Munichandraiah, N.—High Rate Capability of Coconut Kernel Derived Carbon as an Anode Material for Lithium-Ion Batteries; Adv. Mat. Lett, 5(4), 184-190, (2014).

Tobolsky, A. V.—Properties and Structures of Polymers, John Wiley and Sons, (1960).

Van Deventer, J. S.J.; Van Der Merwe P. F.—The Mechanism of Elution of Gold Cyanide from Activated Carbon, Metallurgical and Materials Transactions B-process Metallurgy and Materials Processing Science, (1994), 25.

Van Deventer, J. S. J.; Van der Merwe P. F.—Factors Affecting the Elution of Gold Cyanide from Activated Carbon, Miner. Eng., (1994), 7.

Van Deventer, J. S. J.; Liebenberg, S.P.—The Role of Cyanide in the Multi-Component Elution of Cyanide Complexes from Activated Carbon, The European Journal of Mineral Processing and Environmental Protection, (2003), 1303-0868.

Van Deventer, J.; Bazhko, V.; Yahorova, V.—Comparison of Gold-Selective Exchange Resin and Activated Carbon for the Recovery of Gold from Copper-Gold Leach Liquor, Proceedings of the ALTA 2014 Gold-Precious Metals Sessions, ALTA Metallurgical Services Publications, 23 Melbourne, Australia, pp. 1-17, (2014).

Van der Merwe P. F.—The Kinetic Model for the Decomposition of Cyanide During the Elution of Gold from Activated Carbon, Separation Science and Technology, (1995), 30.

Van der Merwe, P. F.—Fundamentals of the Elution of Gold Cyanide from Activated Carbon, Ph. D. Thesis, University of Stellenbosch, Stellenbosch, (1991).

Vegter, N. M.; Sandenbergh, R .F.—The Kinetics of the Organic Elution of Gold Cyanide from Activated Granular Carbon Using a Aqueous Caustic Acetone Solution, Hydrometallurgy, (1992), 28.

Vegter, N. M.; Botha, A. J.; Van Vuuren, C. P .J.—The Kinetics of Elution of Gold Cyanide from Activated Carbon, 4th International Symposium on Hydrometallurgy, Utah, USA, 1993 Society of Mining, Metallurgy and Exploration. Inc, Colorado, (1993).

Venkatachalam, S.—Hydrometallurgy, Narosa Publishing House: New Dehli, India, (1998).

Wang, Z. et al.—Preparing Microgranules from Waste Polystyrene through a Novel Temperature- and Nonsolvent-Induced Phase Separation Method for Potential Adsorbent, Ind. Eng. Chem. Res., Jan. 21, 2005, vol. 44 (4), pp. 825-831.

Yang, J.; Yeh, S. K.; Chiou, N. R.; Guo, Z.; Daniel, T.; Lee, L. J.—Synthesis and Foaming of Water Expandable Polystyrene-Activated Carbon (WEPSAC)., Polymer, (2009), 50.

G.J. McDougall—The physical nature and manufacture of activated carbon; Journal of the South African Institute of Mining and Metallurgy (1991), vol. 91, No. 4, pp. 109-120.

Zhang, C.; Zhu, B.; Lee, L. J.—Polymer, 52(8), pp. 1847-1855, (2011).

Https://www.astm.org/Standards/D3802.htm ASTM D3802-10, Active Standard, ASTM D3802, Developed by Subcommittee: D28.04, Book of Standards vol. 15.01, Standard Test Method for Ball-Pan Hardness of Activated Carbon.

Yannopoulos, J.—The Extractive Metallurgy of Gold. Van. Nostrand Renibold, (1991), Chapter 8, pp. 141-144.

Yannopoulos, J.—The Extractive Metallurgy of Gold. Van. Nostrand Renibold, (1991), pp. 194-197.

(56) References Cited

OTHER PUBLICATIONS

Yannopoulos, J.—The Extractive Metallurgy of Gold. Van. Nostrand Renibold, (1991), pp. 186-187.
Marsh, H.; Rodriguez-Reinoso, F., Activated Carbon, 2006, Chapter 5, pp. 242-253.
Marsh, H.; Rodriguez-Reinoso, F., Activated Carbon, 2006, Chapter 8, pp. 385-397.
Marsh, H.; Rodriguez-Reinoso, F., Activated Carbon, 2006, pp. 460-462.

* cited by examiner

Processing option : All elements analysed (Normalised)

Ps-SiO2 Site 3

| Spectrum | In stats. | C | O | Si |
|---|---|---|---|---|
| Spectrum 1 | Yes | | 45.98 | 54.02 |
| Spectrum 2 | Yes | | 55.11 | 44.89 |
| Spectrum 3 | Yes | | 54.76 | 45.24 |
| Spectrum 4 | Yes | 97.69 | 2.31 | 0.00 |
| Max. | | 97.69 | 55.11 | 54.02 |

Processing option : All elements analysed (Normalised)

Ps-SiO2

| Spectrum | In stats. | C | O | F | Si |
|---|---|---|---|---|---|
| Spectrum 1 | Yes | 90.81 | 6.46 | 0.78 | 1.95 |
| Mean | | 90.81 | 6.46 | 0.78 | 1.95 |
| Std. deviation | | 0.00 | 0.00 | 0.00 | 0.00 |
| Max. | | 90.81 | 6.46 | 0.78 | 1.95 |
| Min. | | 90.81 | 6.46 | 0.78 | 1.95 |

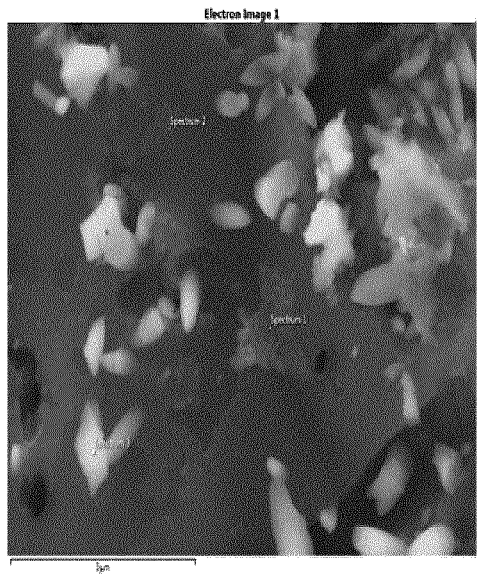
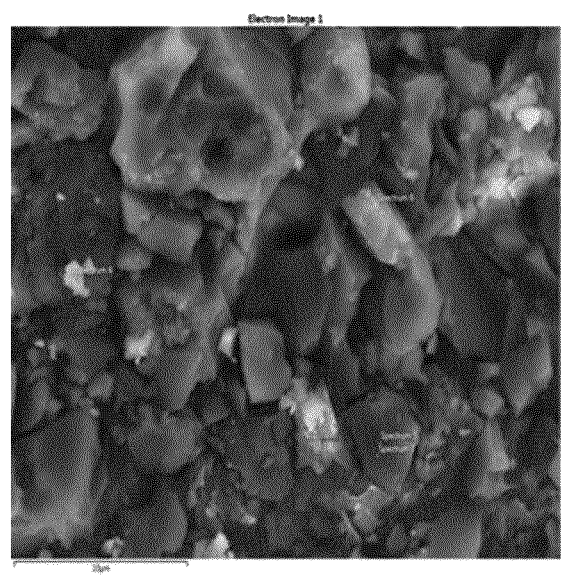
Figure 19A				Figure 19B
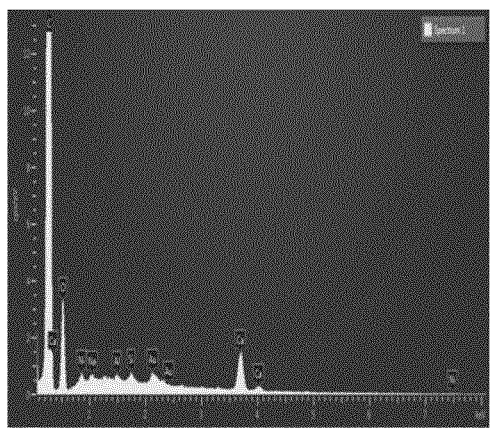
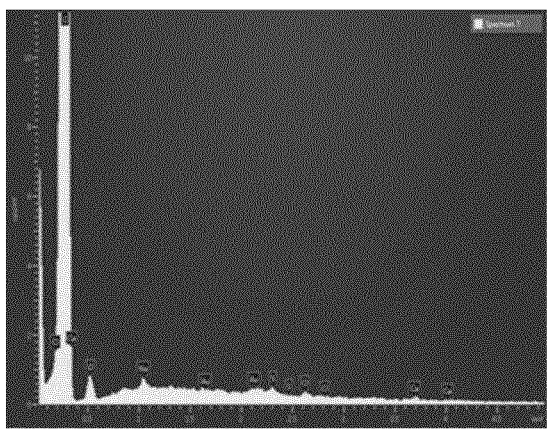
Figure 19C				Figure 19D

ADSORBENT COMPOSITION, METHOD OF MAKING THE SAME, AND USES THEREOF

FIELD

The present invention relates to adsorbent compositions. In particular, the present invention relates to adsorbent compositions, methods of making the same and uses thereof, for example, in separation of precious metals in ore processing.

BACKGROUND

Metal (e.g. precious metals) milling processes typically involve crushing, grinding, leaching, cyanide leaching and metal adsorption through carbon-in-pulp (CIP) or carbon-in-leach (CIL), stripping, electrowinning (EW) and metal recovery circuits. A popular method of extracting metals from ore is through cyanidation due to its relatively low cost and high recovery of metal from various types of ores. Such a process is particularly used with precious metal ores, such as gold ores.

In the processing of gold ore using cyanide, gold is leached from ore then gold ions are adsorbed from the leach solution onto an adsorbent, such as activated carbon (AC). The loaded adsorbent is then separated from the process stream, and the gold ions are desorbed into a smaller volume of solution suitable for metal recovery. The cyanidation leaching circuit usually employs adsorption of dissolved gold into AC in a CIP or CIL circuit, or both. AC is used in the gold industry, however, silver and other precious metals are recovered from their cyanide solution by using AC as well.

Gold adsorption onto AC is a fast process. The coarse AC which is used in the gold industry is about 30-mesh or greater and is added to slurry leached gold in the CIP/CIL circuit to adsorb gold as gold cyanide. AC breaks through attrition in the circuit and fine carbon particles are generated in this process that can result in losses through screens to tailings. The loss of AC may be attributed to, but not limited by, carbon-grit attrition in slurry systems (CIP, CIL), carbon-carbon attrition in solution and slurry systems (CIP, CIL, carbon-in-column (CIC), elution and acid washing), carbon-carbon, and carbon-steel attrition in drying systems (transfer, thermal reactivation), carbon breakage during transfer (in pumps, eductors and on screens), breakage due to thermal shock during reactivation and quenching and chemical shock or during removal of carbon-inorganic composites.

Gold ores are often ground into a fine powder so that the gold particles can be released from the host rock and dissolved into solution. During the gold dissolution step, coarse sized AC particles are added to adsorb gold from solution or slurry. The AC particles are then collected by screening (since they are relatively big, they are retained on the screen) while the aqueous solution and fine undissolved ore particles in the slurry pass through. At this point, the loaded carbon is sent for gold recovery in the elution column, the stripped carbon is then reactivated in the kiln and reused. Because the AC is brittle, some of the particles break apart during the process, resulting in them passing through the screens, ending up with the waste rock in the tailings. Since these AC fines have a larger specific surface area they take up more gold than the coarse fresh AC added to the circuit. As a result, this leads to a loss of gold for mines because the fine AC particles are loaded with gold.

As a result of high potential losses of gold adsorbed to the AC fines, many gold and precious metal producing sites use various methods of collecting the AC fines, including flocculation and filtration systems. These methods are only minimally effective. When sufficient amounts of fine AC are collected, they are shipped off-site for smelting to recover adsorbed gold, this process usually incurs a high cost. This, unfortunately, leads to increased costs (about 6-9 percent and as high as 13% of the value of gold in the fine AC). Other methods, such as mixing collected fine AC with fresh coarse AC and an aqueous solution of a reagent to transfer the gold from the fine AC to the coarse AC, involve agitation and additional AC breakage. A significant source of gold loss is due to some loaded AC that has been reduced, due to attrition, to fine AC particles (which are relatively more heavily loaded with gold) which pass through the screens and report to the tailings.

A need, therefore, exists for the development of a composition and/or method that obviates or mitigates at least one of the disadvantages described above or that provides a useful alternative.

SUMMARY OF THE INVENTION

According to an aspect, there is provided an adsorbent composition comprising: a core having at least one of: (i) wear resistance, (ii) resistance to corrosive condition(s), (iii) at least one thermoplastic material; and (iv) a low porosity; and, at least one coating that, at least, partially covers the core, the at least one coating comprising at least one adsorbent material.

According to another aspect, wherein the core has wear resistance. In another aspect, wherein the core has resistance to corrosive condition(s). In another aspect, wherein the core has a low porosity. In another aspect, wherein the core is non-porous. In another aspect, wherein the core is non-porous such that the adsorbent material remains substantially on the surface of the core. In another aspect, wherein the core is non-porous such that the adsorbent material does not penetrate the surface of the core. In another aspect, wherein the core comprises at least one thermoplastic material. In another aspect, wherein the thermoplastic material comprises at least one polymer, which exhibits glass transition behaviour. In another aspect, wherein the thermoplastic material has a glass transition temperature of at least about 50° C. In another aspect, wherein the thermoplastic material has a glass transition temperature of at least about 70° C. In another aspect, wherein the thermoplastic material has a glass transition temperature of at least about 100° C. In another aspect, wherein the thermoplastic material has a glass transition temperature of at least about 130° C. In another aspect, wherein the thermoplastic material has a glass transition temperature of from about 50° C. to about 200° C. In another aspect, wherein the thermoplastic material has a glass transition temperature of from about 100° C. to about 200° C. In another aspect, wherein the thermoplastic material has a glass transition temperature of from about 130° C. to about 200° C. In another aspect, wherein the at least one polymer is a non-cross-linked polymer. In another aspect, wherein the at least one polymer is selected from the group consisting of polystyrene, polyethylene, poly(methyl methacrylate), polyvinyl chloride, polyamides, polyacrylonitrile butadiene styrene, polyacrylonitrile, polycarbonates, polyphenylene sulfide, polyether sulfone, polyphenylene oxide, nylon, polylactic acid, polytetrafluoroethylene, polyethylene terephthalate, polypropylene terephthalate, and combinations thereof. In another aspect, wherein the thermoplastic material comprises polystyrene. In another aspect, wherein the at least one polymer is a cross-linked polymer. In another aspect, wherein the cross-linked polymer has a degree of cross-linking to make the core harder and more wear resistant. In another aspect, wherein the cross-linked polymer has a degree of cross-linking of at most 20 mol %. In another aspect, wherein the cross-linked polymer has a degree of cross-linking of at most 10 mol %. In another aspect, wherein the cross-linked polymer has a degree of cross-linking of at most 5 mol %. In another aspect, wherein the cross-linked polymer has a degree of cross-linking of at most 1 mol %. In another aspect, wherein the cross-linked polymer has a degree of cross-linking of about 1 mol % to about 20 mol %. In another aspect, wherein the cross-linked polymer has a degree of cross-linking of about 1 mol % to about 10 mol %. In another aspect, wherein the cross-linked polymer has a degree of cross-linking of about 1 mol % to about 5 mol %. In another aspect, wherein the cross-linked polymer is a polymer that has been cross-linked using a cross-linking agent selected from the group consisting of divinyl benzene, divinyl toluene, dimethyl divinyl benzene, dimethyl divinyl toluene, trivinyl benzene, trivinyl napthalene, ethyl acrylate, vinyl acetate, and combinations thereof. In another aspect, wherein the thermoplastic material comprises polystyrene crosslinked with divinylbenzene. In another aspect, wherein the thermoplastic material comprises at least about 50% of one polymer. In another aspect, wherein the thermoplastic material comprises at least about 70% of one polymer. In another aspect, wherein the thermoplastic material comprises at least about 80% of one polymer. In another aspect, wherein the thermoplastic material comprises at least about 99% of one polymer. In another aspect, wherein the thermoplastic material becomes tacky when heated above its glass transition temperature. In another aspect, wherein the core is a suitable shape. In another aspect, wherein the core is a pellet and/or bead. In another aspect, wherein the core has an average particle size greater than about 1 mm. In another aspect, wherein the core has an average particle size greater than about 2 mm. In another aspect, wherein the core has an average particle size of from about 2 mm to about 60 mm. In another aspect, wherein the coating coverage ranges from about 10% of the surface area of the core to about 100% of the surface area of the core. In another aspect, wherein the coating substantially covers the surface area of the core. In another aspect, wherein the adsorbent material comprises a material for adsorbing metal(s) and/or metal ions. In another aspect, wherein the metal(s) and/or metal ions are selected from the group consisting of precious metals, precious metal ions, transition metals, transition metal ions, rare-earth metals and rare-earth metal ions. In another aspect, wherein the metal is selected from the group consisting of gold, silver, rhenium, ruthenium, rhodium, palladium, osmium, iridium, platinum, copper, nickel and combinations thereof. In another aspect, wherein the metal is gold, silver, platinum, copper, and/or nickel. In another aspect, wherein the metal is gold. In another aspect, wherein the adsorbent material comprises at least one non-metal material. In another aspect, wherein the adsorbent material comprises carbon. In another aspect, wherein the adsorbent material comprises activated carbon. In another aspect, wherein the adsorbent material comprises at least one metal oxide material. In another aspect, wherein the adsorbent material comprises metal oxide(s). In another aspect, wherein metal oxide(s) is selected from the group consisting of silica, alumina, and combinations thereof. In another aspect, wherein the adsorbent material is selected from the group consisting of carbon, activated carbon, molecular sieve carbon, silica, activated silica, alumina, activated alumina, zeolites, molecular sieve zeolites, polymeric adsorbents, and combinations thereof. In another aspect, wherein the adsorbent material is porous. In another aspect, wherein the adsorbent material has an average pore diameter of about 0.1 nm to about 30 nm. In another aspect, wherein the adsorbent material has a surface area of about 50 $m^2/g$ to about 2000 $m^2/g$. In another aspect, wherein the amount of the core is greater than about 50 wt % based on the total weight of the absorbent composition. In another aspect, wherein the amount of the core is about 99 wt % to about 80 wt % based on the total weight of the absorbent composition. In another aspect, wherein the amount of the adsorbent material is less than about 50 wt % based on the total weight of the absorbent composition. In another aspect, wherein the amount of the adsorbent material is about 1 wt % to about 20 wt % based on the total weight of the absorbent composition. In another aspect, wherein the average particle size of the adsorbent composition is greater than about 1 mm. In another aspect, wherein the average particle size of the adsorbent composition is about 3 mm and about 70 mm. In another aspect, wherein the adsorbent composition excludes binder(s).

In yet another aspect, there is provided a method of making an adsorbent composition, the method comprising: combining at least one core and at least one adsorbent material, whereby the adsorbent material at least partially covers the at least one core to produce the adsorbent composition.

In yet another aspect, there is provided a method of making an adsorbent composition, the method comprising: combining at least one core and at least one adsorbent material in at least one solvent, whereby the adsorbent material at least partially covers the at least one core to produce the adsorbent composition. In yet another aspect, wherein the at least one core comprises a core having at least one of: (i) wear resistance, (ii) resistance to corrosive condition(s), (iii) a thermoplastic material; and (iv) a low porosity.

In yet another aspect, there is provided a method of making an adsorbent composition, the method comprising: heating at least one core and at least one adsorbent material in at least one solvent, whereby the adsorbent material at least partially covers the at least one core to produce the adsorbent composition. In yet another aspect, wherein the at least one core comprises a core having at least one of: (i) wear resistance, (ii) resistance to corrosive condition(s), (iii) a thermoplastic material; and (iv) a low porosity.

In another aspect, whereby the heating causes the at least one core to become tacky such that the adsorbent material adheres to the at least one core, at least partially surrounding the at least one core. In another aspect, whereby the solvent causes the at least one core to become tacky such that the adsorbent material adheres to the at least one core, at least partially surrounding the at least one core. In another aspect, wherein the adsorbent material adheres via Van der Waals forces and/or mechanical adhesion. In another aspect, wherein the at least one core has been heated above its glass transition temperature such that it becomes tacky. In another aspect, wherein the solvent is a liquid. In another aspect, wherein the solvent comprises inorganic and/or organic solvents capable of assisting in the adherence of the adsorbent material(s) to the core(s). In another aspect, wherein the solvent comprises at least one solvent that acts as a surfactant on the core(s). In another aspect, wherein the solvent comprises substituted and unsubstituted acyclic and cyclic hydrocarbons, substituted and unsubstituted acyclic and cyclic ketones, substituted and unsubstituted acyclic and cyclic heterocyclics, and combinations thereof. In another aspect, wherein the solvent comprises acetone, ethyl acetate, methylene chloride, dichloroethane, cyclohexanone, methyl ethyl ketone, methyl benzene, tetrahydrofuran, and combinations thereof. In another aspect, wherein the solvent comprises water. In another aspect, wherein the solvent is superheated. In another aspect, wherein the solvent is continually agitated for a period of time. In another aspect, wherein during the step of combining, the mixture is continually agitated for a period of time. In another aspect, wherein the solvent is heated to a temperature of about 100° C. to about 200° C. In another aspect, wherein the solvent is heated to a temperature of about 120° C. to about 200° C. In another aspect, wherein the solvent is heated to a temperature of about 120° C. to about 170° C. In another aspect, wherein the solvent is heated to a temperature of about 120° C. to about 150° C. In another aspect, wherein the solvent is heated to a temperature of about 140° C. to about 145° C. In another aspect, wherein the method is carried out at a pressure of about 30 psi to about 50 psi. In another aspect, wherein the pressure is about 40 psi to about 50 psi. In another aspect, wherein the heating occurs for about 50 minutes to about 70 minutes. In another aspect, wherein the heating occurs for about 50 minutes to about 60 minutes. In another aspect, wherein any suitable amounts of adsorbent material(s) and core(s) is used. In another aspect, wherein the amount of adsorbent material(s) is such that agglomeration of the core(s) is minimized during the method. In another aspect, wherein the weight percentage ratios of adsorbent material to core(s) is about 50:50 wt/wt % to about 1:99 wt/wt % based on the total weight of the absorbent composition. In another aspect, wherein the weight percentage ratios of adsorbent material to core(s) is about 1:99 wt/wt % to about 40:60 wt/wt %, about 5:95 wt/wt % to about 30:70 wt/wt %, or about 1:90 wt/wt % to about 20:80 wt/wt %. In another aspect, wherein the at least one core has a low porosity. In another aspect, wherein the at least one core is non-porous. In another aspect, wherein the core is non-porous such that the adsorbent material remains substantially on the surface of the core. In another aspect, wherein the core is non-porous such that the adsorbent material does not penetrate the surface of the core. In another aspect, wherein the core comprises at least one thermoplastic material. In another aspect, wherein the thermoplastic material comprises at least one polymer, which exhibits glass transition behaviour. In another aspect, wherein the thermoplastic material has a glass transition temperature of at least about 50° C. In another aspect, wherein the thermoplastic material has a glass transition temperature of at least about 70° C. In another aspect, wherein the thermoplastic material has a glass transition temperature of at least about 100° C. In another aspect, wherein the thermoplastic material has a glass transition temperature of at least about 130° C. In another aspect, wherein the thermoplastic material has a glass transition temperature of from about 50° C. to about 200° C. In another aspect, wherein the thermoplastic material has a glass transition temperature of from about 100° C. to about 200° C. In another aspect, wherein the thermoplastic material has a glass transition temperature of from about 130° C. to about 200° C. In another aspect, wherein the at least one polymer is a non-cross-linked polymer. In another aspect, wherein the at least one polymer is selected from the group consisting of polystyrene, polyethylene, poly(methyl methacrylate), polyvinyl chloride, polyamides, polyacrylonitrile butadiene styrene, polyacrylonitrile, polycarbonates, polyphenylene sulfide, polyether sulfone, polyphenylene oxide, nylon, polylactic acid, polytetrafluoroethylene, polyethylene terephthalate, polypropylene terephthalate, and combinations thereof. In another aspect, wherein the thermoplastic material comprises polystyrene. In another aspect, wherein the at least one polymer is a cross-linked polymer. In another aspect, wherein the cross-linked polymer has a degree of cross-linking to make the core harder and more wear resistant. In another aspect, wherein the cross-linked polymer has a degree of cross-linking of at most 20 mol %. In another aspect, wherein the cross-linked polymer has a degree of cross-linking of at most 10 mol %. In another aspect, wherein the cross-linked polymer has a degree of cross-linking of at most 5 mol %. In another aspect, wherein the cross-linked polymer has a degree of cross-linking of at most 1 mol %. In another aspect, wherein the cross-linked polymer has a degree of cross-linking of about 1 mol % to about 20 mol %. In another aspect, wherein the cross-linked polymer has a degree of cross-linking of about 1 mol % to about 10 mol %. In another aspect, wherein the cross-linked polymer has a degree of cross-linking of about 1 mol % to about 5 mol %. In another aspect, wherein the cross-linked polymer is a polymer that has been cross-linked using a cross-linking agent selected from the group consisting of divinyl benzene, divinyl toluene, dimethyl divinyl benzene, dimethyl divinyl toluene, trivinyl benzene, trivinyl napthalene, ethyl acrylate, vinyl acetate, and combinations thereof. In another aspect, wherein the thermoplastic material comprises polystyrene crosslinked with divinylbenzene. In another aspect, wherein the thermoplastic material comprises at least about 50% of one polymer. In another aspect, wherein the thermoplastic material comprises at least about 70% of one polymer. In another aspect, wherein the thermoplastic material comprises at least about 80% of one polymer. In another aspect, wherein the thermoplastic material comprises at least about 99% of one polymer. In another aspect, wherein the thermoplastic material becomes tacky when heated above its glass transition temperature. In another aspect, wherein the core is a suitable shape. In another aspect, wherein the core is a pellet and/or bead. In another aspect, wherein the core has an average particle size greater than about 1 mm. In another aspect, wherein the core has an average particle size greater than about 2 mm. In another aspect, wherein the core has an average particle size of from about 2 mm to about 60 mm. In another aspect, wherein the coating coverage ranges from about 10% of the surface area of the core to about 100% of the surface area of the core. In another aspect, wherein the coating substantially covers the surface area of the core. In another aspect, wherein the adsorbent material comprises a material for adsorbing metal(s) and/or metal ions. In another aspect, wherein the metal(s) and/or metal ions are selected from the group consisting of precious metals, precious metal ions, transition metals, transition metal ions, rare-earth metals and rare-earth metal ions. In another aspect, wherein the metal is selected from the group consisting of gold, silver, rhenium, ruthenium, rhodium, palladium, osmium, iridium, platinum, copper, nickel and combinations thereof. In another aspect, wherein the metal is gold, silver, platinum, copper, and/or nickel. In another aspect, wherein the metal is gold. In another aspect, wherein the adsorbent material comprises at least one non-metal material. In another aspect, wherein the adsorbent material comprises carbon. In another aspect, wherein the adsorbent material comprises activated carbon. In another aspect, wherein the adsorbent material comprises at least one metal oxide material. In another aspect, wherein the adsorbent material comprises metal oxide(s). In another aspect, wherein metal oxide(s) is selected from the group consisting of silica, alumina, and combinations thereof. In another aspect, wherein the adsorbent material is selected from the group consisting of carbon, activated carbon, molecular sieve carbon, silica, activated silica, alumina, activated alumina, zeolites, molecular sieve zeolites, polymeric adsorbents, and combinations thereof. In another aspect, wherein the adsorbent material is porous. In another aspect, wherein the adsorbent material has average pore diameter of about 0.1 nm to about 30 nm. In another aspect, wherein the adsorbent material has a surface area of about 50 $m^2/g$ to about 2000 $m^2/g$. In another aspect, wherein the amount of the core is greater than about 50 wt % based on the total weight of the absorbent composition. In another aspect, wherein the amount of the core is about 99 wt % to about 80 wt % based on the total weight of the absorbent composition. In another aspect, wherein the amount of the adsorbent material is less than about 50 wt % based on the total weight of the absorbent composition. In another aspect, wherein the amount of the adsorbent material is about 1 wt % to about 20 wt % based on the total weight of the absorbent composition. In another aspect, wherein the average particle size of the adsorbent composition is greater than about 1 mm. In another aspect, wherein the average particle size of the adsorbent composition is about 3 mm and about 70 mm. In another aspect, wherein the method excludes the use of binder(s).

In another aspect, there is provided an adsorbent composition made by the method as described herein.

In another aspect, there is provided use of the adsorbent composition as described herein for adsorbing at least one metal and/or metal ion.

In another aspect, there is provided use of the adsorbent composition as described herein in metal ore processing. In another aspect, wherein the metal ore processing comprises CIP, CIL, and/or stripping processes.

In yet another aspect, there is provided a method for adsorbing at least one metal and/or metal ion comprising: using the adsorbent composition as described herein for adsorbing at least one metal and/or metal ion.

In yet another aspect, there is provided a method for metal ore processing comprising:
using, in at least one step in metal ore processing, the adsorbent composition as described herein. In yet another aspect, wherein the adsorbent composition adsorbs at least one metal and/or metal ion. In yet another aspect, wherein the metal ore processing comprises CIP, CIL, and/or stripping processes.

In yet another aspect, there is provided a method for metal ore processing comprising: in at least one step of metal ore processing, which uses an adsorbent material for adsorbing at least one metal and/or metal ion, and replacing with the adsorbent composition as described herein. In another aspect, wherein the adsorbent composition adsorbs at least one metal and/or metal ion. In another aspect, wherein the metal ore processing comprises CIP, CIL, and/or stripping processes.

In yet another aspect, there is provided a method for metal ore processing comprising: an adsorbent material used in the process and/or a loaded adsorbent material produced from the process being converted to the adsorbent composition as described herein.

In another aspect, there is provided a method for metal ore processing comprising: an adsorbent material used in the process and/or a loaded adsorbent material produced from the process being converted to the adsorbent composition using the method as described herein.

The aspects described above can be combined in any suitable combination.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from the detailed description.

BRIEF DESCRIPTION OF THE FIGURES

Embodiments will now be described, by way of example only, with reference to the accompanying Figures in which:

FIG. 19A-D show SEM and EDS analysis of gold loading on PS/AC beads.

DETAILED DESCRIPTION

Figure 1:
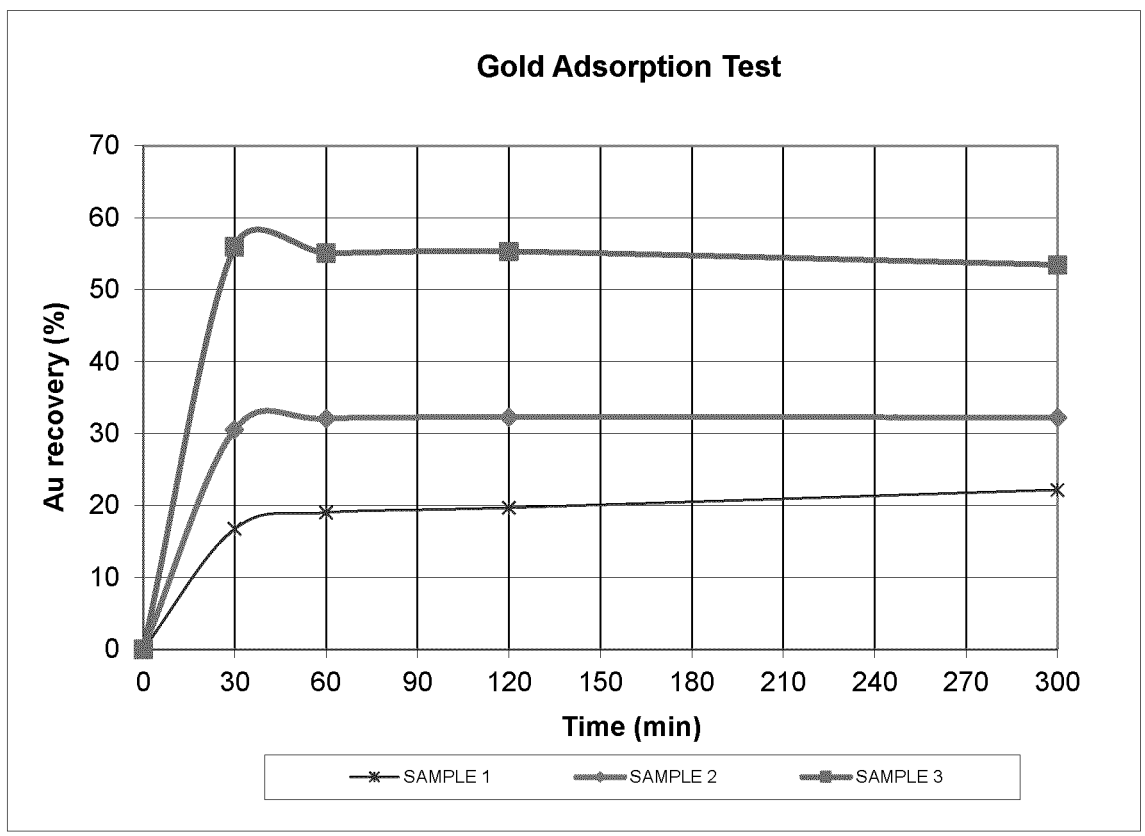
FIG. 1 shows the gold adsorption test results for Example 1.

When describing the compositions, methods and uses, the following terms have the following meanings unless otherwise indicated.

As used herein, the term "porous" denotes spaces, voids or interstices that provide channels, paths or passages through which a fluid can flow. Therefore, a non-porous material means a material that may be mostly non-porous such that a fluid will not cover, block, clog or fill pores to any substantial extent. A porous material has "micro", "meso" and/or "macro" pores which according to the International Union of Pure and Applied Chemistry are the classifications recommended for pores less than about 2 nm, about 2 to about 50 nm, and greater than about 50 nm respectively. The term porous will be used herein to include pores of all sizes, including open or closed pores. Non-porous means that there is about 1% or less pore content as measured by scanning electron microscopy of a particle (cross-section) surface at 5000× magnification. Low porosity material means that the porosity of the material is such that a substantial amount of fluid is inhibited from flowing into the material. For example, and without being limited thereto, a low porous material used in metallurgical processes, such as gold extraction, would have a porosity to inhibit a substantial amount of fluid from flowing into the material and depositing a targeted metal such that it would be difficult to extract the targeted metal.

As used herein, the term "coating" refers to partially or completely covering the surface of a component (e.g. core).

As used herein, the term "tacky" refers to the stickiness of the surface of the core(s) such that an adsorbent material may adhere thereto.

The term "superheated solvent" refers to a solvent that is heated under pressure conditions allowing it to attain temperatures in excess of its' boiling point.

The term "glass transition temperature" refers to the temperature at which the mechanical properties of a thermoplastic material change. Above its glass transition temperature, the physical properties of a thermoplastic change without an associated phase change.

In understanding the scope of the present application, the articles "a", "an", "the", and "said" are intended to mean that there are one or more of the elements, unless specifically stated otherwise. The use of "or" means "and/or", unless specifically stated otherwise. Additionally, the term "comprising" and its derivatives, as used herein, are intended to be open ended terms that specify the presence of the stated features, elements, cores, groups, integers, and/or steps, but do not exclude the presence of other unstated features, elements, cores, groups, integers and/or steps. The foregoing also applies to words having similar meanings such as the terms, "including", "having" and their derivatives.

It will be understood that any aspects described as "comprising" may also "consist of" or "consist essentially of," wherein "consisting of" has a closed-ended or restrictive meaning and "consisting essentially of" means including the components or steps specified but excluding other components or steps except for materials present as impurities, unavoidable materials present as a result of processes, and components added for a purpose other than achieving the technical effect of the invention. For example, a composition defined using the phrase "consisting essentially of" encompasses a set of components that comprise less than 5% by weight, typically less than 3% by weight, more typically less than 1% by weight of non-specified components.

It will be understood that any feature defined herein as being included may be explicitly excluded from the claimed invention by way of proviso or negative limitation.

In addition, all ranges given herein include the end of the ranges and also any intermediate range points, whether explicitly stated or not.

Finally, terms of degree such as "substantially", "about", "significantly" and "approximately" as used herein mean a reasonable amount of deviation of the modified term such that the end result is not majorly changed. These terms of degree should be construed as including a deviation of at least ±5% of the modified term if this deviation would not negate the meaning of the word it modifies.

Described herein are adsorbent compositions, methods of making the compositions and uses thereof.

In various embodiments, the adsorbent compositions described herein may be used as a substitute for pure activated carbon to reduce gold losses resulting from the generation of carbon fines in CIP and CIL processes. It may specifically be used as a substitute for pure activated carbon to achieve effective gold recovery from high gold concentration solutions, such as leach solutions, and from low gold concentration solutions, such as mine effluents.

Adsorbent Compositions

In an embodiment, an adsorbent composition comprises a core with at least one coating that, at least, partially covers the core. The core has at least one of (i) wear resistance, (ii) resistance to corrosive condition(s), (iii) a thermoplastic material; and (iv) a low porosity. The at least one coating comprises at least one adsorbent material.

The core may, therefore, have the property of being wear resistant, resistant to corrosive condition(s), such as acid or base conditions, have at least one thermoplastic material, or have a low porosity, or have any combination thereof. In a specific embodiment, the core is wear resistant and has at least one thermoplastic material. In another specific embodiment, the core has a low porosity, is wear resistant and has at least one thermoplastic material. In a typical embodiment, the core is wear resistant, resistant to corrosive condition(s), has at least one thermoplastic material and low porosity. More typically, the core is non-porous. In particular embodiments, the core is non-porous such that the adsorbent material remains substantially on the surface of the core (e.g. does not penetrate the core).

The thermoplastic material may comprise at least one polymer, which exhibits glass transition behaviour. The at least one polymer may be at least one non-cross-linked polymer, at least one cross-linked polymer, or combinations thereof. Examples of thermoplastic materials include, but are not limited thereto, polystyrene, polyethylene, poly (methyl methacrylate), polyvinyl chloride, polyamides, polyacrylonitrile butadiene styrene, polyacrylonitrile, polycarbonates, polyphenylene sulfide, polyether sulfone, polyphenylene oxide, nylon, polylactic acid, polytetrafluoroethylene, polyethylene terephthalate, polypropylene terephthalate or combinations thereof. Thermoplastic materials may, therefore, include ion-exchange resins.

Without being bound by theory, a thermoplastic material has independent polymer chains in an amorphous spaghetti-like structure. When heated above the glass transition temperature, segments of these polymer chains that are at/near the surface become somewhat mobile as the secondary bonds that were pinning them to the core surface are overcome by molecular vibrations. These portions of polymer chains are available to adhere to components that come into contact with it. With further heating, the chains can vibrate apart to form a viscous liquid. On the other hand, a heavily cross-linked bead is a thermoset. The polymer chains cannot move independently since they are linked together by primary carbon-carbon bonds into a rigid macromolecule. When these types of polymers are heated, they tend to disintegrate as the thermal vibrations break apart the primary bonds holding it together. Therefore, when including or choosing cross-linked polymers for heating, these polymers are typically, lightly cross-linked so as to exhibit glass-transition behavior.

In certain embodiments, the thermoplastic material comprises at least about 50% of one polymer, at least about 70% of one polymer, at least about 80% of one polymer, or at least about 99% of one polymer.

In a specific embodiment, the thermoplastic material becomes tacky when heated above its glass transition temperature. In particular embodiments of thermoplastic materials, the thermoplastic material may have a glass transition temperature of at least about 50° C., at least about 70° C., at least about 100° C., or at least about 130° C. In a more specific embodiment, the thermoplastic material has a glass transition temperature of from about 50° C. to about 200° C. In another embodiment, wherein the thermoplastic material has a glass transition temperature of from about 100° C. to about 200° C. In another aspect, wherein the thermoplastic material has a glass transition temperature of from about 130° C. to about 200° C.

With respect to the cross-linked polymers, there may be a degree of cross-linking to make the core harder and more wear resistant. The cross-linked polymer may have a degree of cross-linking of at most 20 mol %, at most 10 mol %, at most 5 mol %, or at most 1 mol %. In some embodiments, the cross-linked polymer has a degree of cross-linking of about 1 mol % to about 20 mol %, about 1 mol % to about 10 mol %, or about 1 mol % to about 5 mol %.

Examples of cross-linked polymers include, but are not limited to, a polymer that has been cross-linked using a cross-linking agent selected from the group consisting of divinyl benzene, divinyl toluene, dimethyl divinyl benzene, dimethyl divinyl toluene, trivinyl benzene, trivinyl napthalene, ethyl acrylate, vinyl acetate, and combinations thereof.

In specific embodiments, the thermoplastic material comprises polystyrene. In another embodiment, the thermoplastic material comprises polystyrene crosslinked with divinylbenzene.

The core may be any suitable size and shape. The core, in a certain embodiment, may be a pellet and/or bead. The size of the core will depend on the use of the adsorbent composition. For example, if the composition is to be used in a metallurgical extraction process, the core may, typically, have an average particle size greater than about 1 mm or greater than about 2 mm. More specifically, the core may have average particle size of from about 2 mm to about 60 mm. Even more specifically, the core may have an average particle size of from about 3 mm to about 50 mm. More specifically, the core has an average particle size of about 3 mm and about 70 mm, about 3 mm and about 60 mm, or about 3 mm and about 50 mm.

Any suitable particle sizes of the adsorbent composition may be used depending on the application for its use. In some embodiments, the average particle size is greater than about 1 mm or greater than about 2 mm. In specific embodiments, the average particle size is about 3 mm and about 70 mm, about 3 mm and about 60 mm, or about 3 mm and about 50 mm.

In a specific embodiment, the core is a polystyrene resin, in the form of beads, which are coated with an adsorbent material. Polystyrene is useful in metallurgical processes because it is chemically resistant to strong alkaline and acidic solutions and has a high melting temperature. Polystyrene may also be crosslinked, forming a co-polymer core. Cross-linked polymers will undergo less swelling when put in solution. Cross-linking may decrease the ion exchange capacity, rate of ion exchange and abrasion resistance, but increase mechanical strength of resins and ion exchange selectivity. Therefore, the degree of cross-linking will depend on the desired use and process used. In certain embodiments, the addition of relatively small amounts of a cross-linker, such as DVB, makes the cores harder and more wear resistant.

The adsorbent materials that may be used include any material that is capable of adsorbing metal(s) and/or metal ions. The metal(s) and/or metal ions may be selected from, for example, precious metals, precious metal ions, transition metals, transition metal ions, rare-earth metals and rare-earth metal ions. The metal may be selected from the group consisting of gold, silver, rhenium, ruthenium, rhodium, palladium, osmium, iridium, platinum, copper, nickel and combinations thereof. More specifically, the metal may be gold, silver, platinum, copper, and/or nickel. In gold recovery processes from metal ores, the adsorbent material is capable of adsorbing gold. The adsorbent material may, therefore, be an ion-exchange material.

In certain embodiments, the adsorbent material, itself, comprises at least one non-metal material, at least one metal oxide material, or combinations thereof. Typically, the adsorbent material is porous.

The adsorbent material may include, and without being limited thereto, carbon, activated carbon, molecular sieve carbon, silica, activated silica, alumina, activated alumina, zeolites, molecular sieve zeolites, polymeric adsorbents, and any combination thereof. The activated carbon can be extracted from a number of carbonaceous sources including, but not limited to coal, wood, a plant, coconut, and nutshells. Activated carbon is carbon that has been treated to impart high absorbent qualities to the carbon. The carbon is normally produced by pyrolysis of carbonaceous material and thereafter subjected to an appropriate activation process. Activation is customarily carried out by heating at high temperatures (650° C.-900° C.) which produces in the carbon a particulated structure. Usually the finely divided carbon has an surface area of about 200 to about 2000 $m^2/g$.

The adsorbent material may have any suitable average pore diameters. In some embodiments the average pore diameter is about 0.1 nm to about 30 nm, about 0.1 nm to about 25 nm, about 0.1 nm to about 20 nm, about 0.1 nm to about 10 nm, about 0.1 nm to about 5 nm, about 0.3 nm to about 1 nm, or about 1 nm to about 5 nm.

The adsorbent material may have any suitable surface areas. In some embodiments the surface area is about 50 $m^2/g$ to about 2000 $m^2/g$, about 50 $m^2/g$ to about 1500 $m^2/g$, about 80 $m^2/g$ to about 1200 $m^2/g$, about 100 $m^2/g$ to about 1000 $m^2/g$, about 200 $m^2/g$ to about 900 $m^2/g$, about 200 $m^2/g$ to about 700 $m^2/g$, or about 400 $m^2/g$ to about 700 $m^2/g$.

Any suitable weight percentages may be used for the core and adsorbent material. Some embodiments include about 99 wt % to about 50 wt % of the core based on the total weight of the absorbent composition. More specific embodiments include about 99 wt % to about 65 wt % of the core, about 95 wt % to about 75 wt % of the core, or about 95 wt % to about 85 wt % of the core. Some embodiments include about 1 wt % to about 50 wt % of the absorbent material based on the total weight of the absorbent composition. More specific embodiments include about 1 wt % to about 20 wt % of the absorbent material, about 1 wt % to about 15 wt % of the absorbent material, or about 10 wt % to about 15 wt % of the absorbent material.

Any suitable coverage of the core(s) with the adsorbent material may be used. The coating itself at least partially covers the core. In embodiments, the coating completely covers the core. The coating may cover a wide range of the surface area of the core. For example, the coverage may range from about 10% of the surface area of the core to about 100% of the surface area of the core and any percentage therein. In some embodiments, the adsorbent material coats at least about 50% of the surface of the core but other amounts may be suitable depending on the desired use. In other embodiments, the adsorbent material coats at least about 60% of the surface of the core, at least about 70% of the surface of the core, at least about 80% of the surface of the core, at least about 90% of the surface of the core, or at least about 95% of the surface of the core.

In a particular embodiment, a polystyrene bead is coated with activated carbon. Typically, the use of carbon in gold recovery is favourable because carbon has a large surface area, high adsorption capacity, porous structure, high purity standards and low cost. The adsorbent material typically coats at least about 90% of the surface of the core but other amounts may be suitable depending on the desired use.

Based on the above, other suitable cores and adsorbent materials used in the adsorbent composition would be apparent to those skilled in the art based on the description herein.

The adsorbent composition described herein may adsorb gold ions from low concentration solutions like mine effluent as well as from leached solutions in gold mills.

Method of Making Adsorbent Compositions

In a general embodiment for making an adsorbent composition described herein, the method comprises combining at least one core and at least one adsorbent material, whereby the adsorbent material, at least, partially covers the at least one core to produce the adsorbent composition.

In an embodiment for making an adsorbent composition described herein, the method comprises heating at least one core and at least one adsorbent material in at least one solvent, whereby the adsorbent material, at least, partially covers the at least one core to produce the adsorbent composition.

The core(s) and adsorbent material(s) may be as described above with respect to the adsorbent composition.

In specific embodiments, the at least one core is heated such that it becomes tacky and the adsorbent material(s) adheres to the at least one core. Without being bound by theory, the adsorbent material adheres via Van der Waals forces. For example, dispersive adhesion is the driving force for forming the coating on the core at certain temperatures, but once the cores are cooled, the polymer and the coating is also locked together by "mechanical adhesion". In typical embodiments, the core(s) and the adsorbent material(s) have sufficient cohesive strength such that the cohesive integrity is substantially maintained when the adsorbent composition is performing a desired function. At least one core may be heated above its glass transition temperature such that it becomes tacky for the adsorbent material to adhere to the core.

With respect to heating the core(s) and the adsorbent material(s) in at least one solvent, in a specific embodiment, the method involves heating the core(s) and the adsorbent material(s) while dispersed within the solvent (e.g. gas and/or liquid). The solvent used in the methods described herein may be any suitable solvent. The solvent may be organic and/or inorganic solvent(s) that are capable of assisting in the adherence of the adsorbent material(s) to the core(s). The solvent is typically a liquid. Examples include, and without being limited thereto, water, alcohols, ketones, organic acids, hydrocarbons and combinations thereof. However, gases, such as inert gases, may be used to suspend the core(s) and the adsorbent material(s).

The temperature chosen for heating the core(s) and the adsorbent material(s) in at least one solvent, will depend on the material(s) used for the core(s). In typical embodiments, the core(s) and the adsorbent material(s) in solvent is heated to a temperature of about 100° C. to about 200° C. Temperatures may include a particular temperature or range from about 120° C. to about 200° C., about 120° C. to about 170° C., about 120° C. to about 150° C., or about 140° C. to about 145° C.

In further embodiments, the solvent has a temperature in the range of about 130° C. to about 150° C., such as about 130° C., about 135° C., about 140° C., or about 145° C., to about 135° C., about 140° C., about 145° C. or about 150° C.

The heating may occur in a pressure chamber such as an autoclave.

In typical embodiments, the method may also include agitation of the mixture. In particular, the core(s) and the adsorbent material(s) in at least one solvent may be continually agitated for a period of time. The time for agitation will vary and depend upon the time required for the adsorbent material(s) to adhere to at least a portion of the core(s).

The period of time for heating and/or agitation will be any suitable time period and may depend on the desired coverage of the adsorbent material(s). One skilled in the art would be able to determine the suitable time. In some embodiments, the period of time may from about 40 to about 80 minutes. Typically, the time period is about 50 to about 70 minutes.

The method may be carried out under any suitable pressure. For example, the solvent may be superheated such that the pressure may be whatever the equilibrium vapour pressure of the solvent is at the temperature required to make the core tacky. In other embodiments, the chosen pressure will be any suitable pressure such that, for example, the adsorbent material, at least, partially covers the core(s) to produce the adsorbent composition. Some typical pressures include, but are not limited to, about 30 to about 50 psi. Typically, the method is conducted at a pressure of about 40 psi to about 50 psi. In specific embodiments, the pressure will depend on the solvent used to achieve a superheated solvent.

The method may further comprise cooling and/or filtering the adsorbent composition produced from the method. The adsorbent composition may be further washed with at least one suitable solvent, such as, for example, any of the solvents noted above for the method.

Any suitable amounts of adsorbent material(s) and core(s) may be used during the method. Typically, the amount of adsorbent material(s) is such that agglomeration of the core(s) is minimized during the method of making the adsorbent composition. Any excess adsorbent material(s) left over from the method can be re-used when the method is repeated.

Consequently, any suitable weight percentage ratios of adsorbent material to core(s) may be used. Some embodiments of the ratio of adsorbent material to core(s) include about 50:50 wt/wt % to about 1:99 wt/wt % of the core based on the total weight of the absorbent composition. More specific embodiments of the ratios include about 1:99 wt/wt % to about 40:60 wt/wt %, about 5:95 wt/wt % to about 30:70 wt/wt %, or about 1:90 wt/wt % to about 20:80 wt/wt %.

The description provided above under the adsorbent composition section can be applied with respect to the method described herein, including the wt %, particle sizes, types, etc.

In particular embodiments, the method comprises heating a suspension of at least one core and at least one adsorbent material in a fluid. The core comprises at least one thermoplastic material and the adsorbent material comprises a non-metal and/or metal oxide material, whereby the adsorbent material, at least, partially covers the at least one core to produce the adsorbent composition. The core is polystyrene and/or polystyrene-divinyl benzene co-polymers. The adsorbent material is activated carbon and the fluid is water. The water is superheated and the core(s) are suspended in the water with an excess of activated carbon. The mixture is stirred continually and heating occurs above the glass transition temperature of the thermoplastic material, but below the melting temperature of the thermoplastic material. As a result, the activated carbon, at least, partially covers at least one core to produce the adsorbent composition. The core(s) are, typically, beads.

Although the method described herein applies heat to promote the adherence of the adsorbent material to the core(s), it may be sufficient to use a solvent that essentially causes the surface of the core(s) to become tacky without the application of heat. Any suitable solvents that are able to cause the surface of the core to become tacky may be used. Examples of such solvents include substituted and unsubstituted acyclic and cyclic hydrocarbons, substituted and unsubstituted acyclic and cyclic ketones, substituted and unsubstituted acyclic and cyclic heterocyclics. More specific examples include acetone, ethyl acetate, methylene chloride, dichloroethane, cyclohexanone, methyl ethyl ketone, methyl benzene, tetrahydrofuran, and mixtures thereof. Examples include any solvent that acts as a surfactant on the core(s) (e.g. thermoplastic), including inorganics like acids or bases or organic surfactants.

Although the method described herein uses a solvent, the method may also occur without a solvent. In an embodiment, the method comprises mixing and heating at least one core and at least one adsorbent material, whereby the adsorbent material, at least, partially covers the at least one core to produce the adsorbent composition.

In typical embodiments, the adsorbent composition, and method of making same, excludes the use of binder(s) for adhering the adsorbent material to the core(s).

Uses of Adsorbent Compositions

The adsorption composition described herein may be used in any metal ore processing. In embodiments, the adsorbent composition can be used for adsorbing metal(s), such as, for example, precious metals and transition metals.

In embodiments, a typical industrial gold milling process involves crushing, grinding, leaching and gold adsorption through CIP or CIL, stripping, EW and gold recovery circuits. FIGS. 12-15 presents the processing of material in gold production (http://www.summit-vallely.com/ecell, Summit Valley Equipment & Engineering, 784 west, 500 south suit 900, Utah 84087, USA., incorporated herein by reference).

One of the typical methods of extracting gold from ore is through cyanidation due to its relatively low cost and high recovery from various types of ores. The reaction between cyanide and precious metals has been proposed by many researchers. The most important reactions are shown below (Yannopoulos, J. *The Extractive Metallurgy of Gold*. Van. Nostrand Renibold, 1991, incorporated herein by reference):

Elsner's Equation:

$$4Au + 8NaCN + O_2 + 2H_2O \rightarrow 4NaAu(CN)_2 + 4NaOH \quad \text{Equation 1}$$ 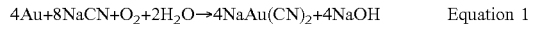

Janin's Equation:

$$2Au + 4NaCN + 2H_2O \rightarrow 2NaAu(CN)_2 + 2NaOH + H_2 \quad \text{Equation 2}$$ 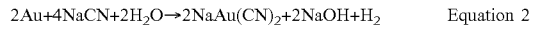

Bodlaender's Equations $$2Au + 4NaCN + 2H_2O + O_2 \rightarrow 2NaAu(CN)_2 + 2NaOH + H_2O_2 \quad \text{Equation 3}$$ 

$$2Au + 4NaCN + H_2O_2 \rightarrow 2NaAu(CN)_2 + 2NaOH \quad \text{Equation 4}$$ 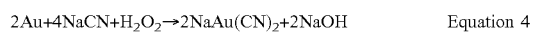

The overall equation from 3 and 4 is the same as Elsner's equation.

In the processing of gold ore using cyanide, gold ions may first be adsorbed from the leach solution onto the adsorbent composition described herein. The loaded adsorbent material is then separated from the process stream, and the gold ions are desorbed into a smaller volume of solution suitable for metal recovery. The cyanidation leaching circuit may employ adsorption of dissolved gold into the adsorbent composition in a CIP or CIL circuit that is comprised of a series of agitated tanks, the number of which depends on throughput and ore grade.

For example, gold ores are often ground to a fine powder so the gold particles can be released from the host rock and dissolved into solution. Gold is leached from oxidized ores using a cyanide solution. Once dissolved, the gold is recovered from the leach solution using the adsorbent composition to adsorb the gold cyanide complexes. This is followed by stripping of the gold cyanide complex from the adsorbent composition, after loading them into a stripping column, by contacting them with a hot caustic solution. This creates a concentrated gold solution from which the gold is recovered by electrowinning. In CIP and CIL processes, the adsorbent composition is mixed with ground leached gold ore in a series of agitated tanks. The loaded adsorbent composition in CIP and CIL and ore are separated from the discharge of each tank (typically by screening) with the adsorbent composition being passed to the previous tank while the ore slurry moves along to the next tank in series in a counter-current manner. The dissolved gold cyanide adsorbs on the adsorbent composition. Therefore, the adsorption composition described herein is suitable for gold adsorption in conventional leaching steps and stripping in conventional stripping columns. Similarly, the adsorption composition is suitable for metal adsorption in any metal ore processing.

The adsorption composition described herein can act as an ion-exchange composition, whereby the adsorbent material is capable of adsorbing metal ions, selectively. The core(s) provide the structural support and the adsorbent material acts as the functional group, which is responsible for the interaction with the ions of interest in a metallurgical process for extraction of metals from solutions. The adsorption of metal (e.g. gold) on the adsorbent material is a reverse process of elution of metal (e.g. gold) from adsorbent material. Many factors may affect the adsorption. These include, but are not limited to, temperature, solution pH, ion strength and concentration of other metals. While not wishing to be bound by theory, the rate of adsorption/desorption may be controlled by mass transport of metal ions (e.g. gold cyanide) across the solution films around the adsorbent material, transport of the dissolved specifies in the solution-filled-pores by diffusion or the adsorption/desorption reactions and transport of the adsorbed ions (e.g. gold cyanide ion pair) along the pore by surface diffusion.

Zinc cyanide, thiourea, and thiocyanate are known for use in elution systems to extract gold from resins. Once used in a metallurgical process, the adsorption composition will be stripped and may be regenerated after the elution process is completed to take out the adsorbed metal species from the adsorbent material and allow the composition to be used again for metallurgical processes (e.g. gold adsorption). For example, the absorbent composition is placed in an elution column. Under a constant flow rate, temperature and pressure, a strip cycle is run for a period of time and the adsorbent composition is recovered from the bottom of the elution column.

When the adsorbent composition described herein is used, in embodiments, the adsorbent composition allows for the adsorption of gold, without the substantial attrition of the adsorbent material and subsequent loss of gold to the tailings. In the gold mill, when activated carbon is used alone, activated carbon of a middling size are captured on "safety screens". This captured carbon is denoted as "carbon fines" and set aside because it cannot remain in the circuit because any further size reduction would allow it to pass through screens and report to tailings and cannot be treated in the stripping column.

The adsorbent composition described herein may be used in any appropriate step in metal ore processing. For example, it may be added to the CIP and or CIL tanks, and for the stripping circuit into the stripping vessel for metal ore processing. This will be part of the carbon circuit, just after the last leaching tank in metal ore processing (e.g. gold processing). Also in carbon management circuits, the overflow from carbon settling tank reports to the CIP circuit where some loaded carbon fines are lost to tailings. Therefore, the over flowed loaded carbon fines can be used to generate an adsorbent composition that can be returned to the circuit via the CIP and CIL tanks. In other words activated carbon may be used in metal extraction in conjunction with an adsorbent composition, whereby loaded carbon fines may be used to make the adsorbent composition described herein, where the adsorbent material is already loaded with gold and adhered to core(s) to make the adsorbent composition.

In embodiments, there is a method for adsorbing at least one metal and/or metal ion. The method comprises using the adsorbent composition described herein for adsorbing at least one metal and/or metal ion. In at least one step of metal ore processing, whereby an adsorbent material for adsorbing at least one metal and/or metal ion may be used but, instead, the adsorbent composition described herein is used for adsorbing at least one metal and/or metal ion.

In other embodiments, in the method of metal ore processing, the adsorbent material used in the process and/or the loaded adsorbent material produced from the process is converted to an adsorbent composition described herein. For example, the adsorbent material used in the process and/or the loaded adsorbent material produced from the process is used in any one of the methods of making the adsorbent composition described herein. In addition, the resultant adsorbent composition is used in the metal ore processing.

The above disclosure generally describes the present invention. A more complete understanding can be obtained by reference to the following specific Examples. The Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Production of AC Coated Polystyrene Beads:

Activated carbon fines were coated onto polystyrene beads to produce activated carbon functionalized ion exchange beads. This was carried out by adding polystyrene beads to an excess of activated carbon in ultrapure deionized water in a titanium autoclave. The autoclave was sealed and heated to a temperature above the glass transition temperature of polystyrene, and below the melting point of polystyrene. Constant stirring was employed to maintain a suspension of the polystyrene beads and activated carbon in order to hinder agglomeration of the beads. The activated carbon fines adhered to the exterior surface of the beads and produced polystyrene activated carbon (PS/AC) beads.

Gold Loading Tests:

The capacity of fresh activated carbon and PS/AC beads to adsorb gold from industrial gold-cyanide leach solutions was measured using Goldcorp's Standard Operating Procedure, SOP, referred to as an "activity test", which was performed at the Musselwhite and Red Lake gold mines. The test involved placing a fixed quantity of activated carbon or PS/AC beads into an HDPE bottle along with about 1 L of gold containing leach solution that was collected from the circuit. The bottle was then placed on a bottle-roll apparatus, which rotated the bottles at 40 rpm in order to provide mixing. A 100 ml sample was gathered from each bottle roll bottle after about 30 minutes, one hour, and two hours and filtered by gravity using a paper filter. A 500 ml sample was also gathered after about 5 hours, corresponding to the end of the "activity test". All solution samples were analyzed for dissolved gold concentration by flame atomic absorption spectroscopy (FAAS). These values for instantaneous gold concentration were compared to the gold concentration of the original solution to calculate the recovery of gold from the leach solution onto the activated carbon as a function of time. At the end of the test, the gold loaded beads themselves were also extracted, rinsed, and analyzed for gold by fire assay in order to directly calculate the gold recovery and validate the results from the wet analyses. When all assay results were obtained, gold adsorption versus time curves were plotted.

The gold leach solution that was used as the source of gold complexes to load onto the activated carbon and PS/AC bead samples was collected. Using 20 litre plastic buckets, samples of the slurry being fed to the first tank of the CIP circuit were collected. The slurry was then filtered using a pressure filter to produce a sample of clarified leach solution referred to as a "leach tails solution". The number of buckets of slurry collected depended on the number of tests conducted. Usually two half-buckets (3.5 US gallon) of slurry was required to produce about 5 to about 6 L of clarified leach solution. The amount of leach tails solution needed for each activity test was 1L. Smaller amounts of leach solution (usually 500 ml) were also collected for analysis of pH, and initial gold and cyanide concentrations. The pH of the solution in one of the 500 ml samples was measured using a YSI model 4010-1 MultiLab IDS meter equipped with a YSI model 4110 temperature compensated pH probe. The meter was calibrated using a two point automatic pH calibration method, as described in the instrument's operating manual using a set of pH 7 and 10 buffers (YSI). The cyanide concentration was determined by silver nitrate titration using a 0.01 M silver nitrate solution. The procedure for free cyanide titration (leach/grinding thickener/CIP) included: filtering the solution sample through a Whatman #1 qualitative filter paper (11 um), measuring a 10 ml sample of the filtered solution and adding it to a clean 50 ml beaker, adding about 5 drops of Rhodanine indicator to the sample and stirring; the solution will turn a yellow/orange, recording the start volume (ml) of silver nitrate solution in the burette, titrating the sample slowly with the silver nitrate solution, while stirring the sample, and stopping titrating immediately once the sample turns a pale pink colour (end point), and recording the end volume (ml) of silver nitrate in the burette.

All wet samples collected were analyzed for gold by FAAS. The AA unit used was a Perkin Elmer PinAAcle 500, which was set at a wavelength of 242.8 nm. The calibration standards used were: 5.0, 10.0, 20.0, and 30.0 ppm Au, which were prepared by pipetting the necessary quantities of 1000 ppm Au stock solution into 1000 ml volumetric flasks, and adding: 100 ml of concentrated hydrochloric acid, 30 ml of concentrated nitric acid, and filling with distilled water. The gold solution used in the loading tests typically contained from about 5.0 to about 6.3 ppm of gold, Au (5.0 to 6.3 g/t), about 340 ppm to about 390 ppm of cyanide, $CN^-$, and a pH of about 10.5 to about 10.9.

Figure 16:
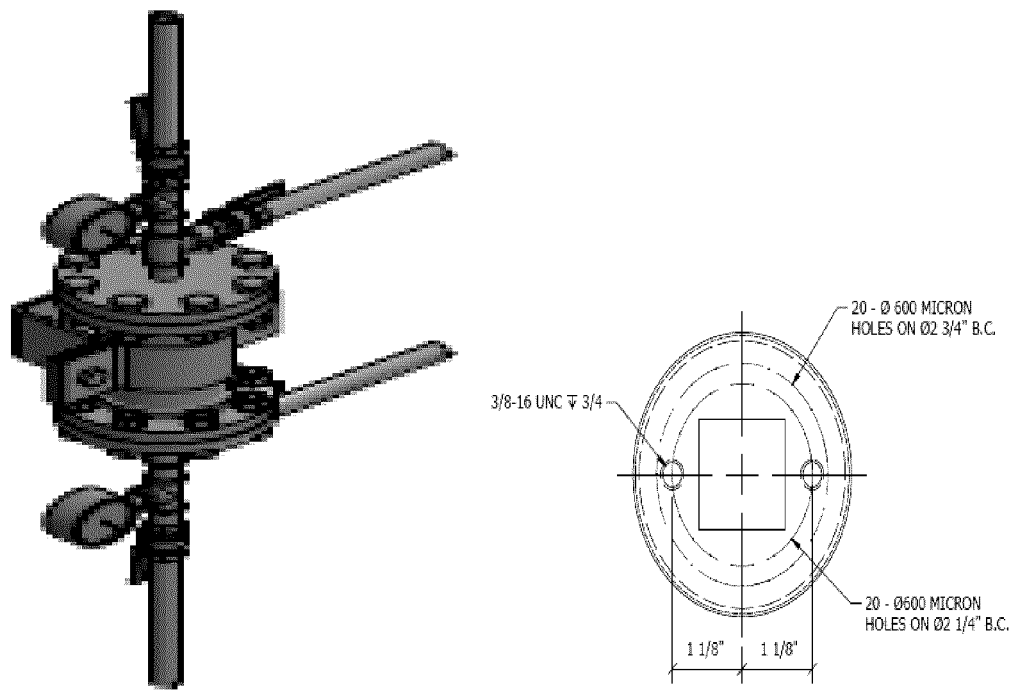
FIG. 16 show a mini-elution column.

Gold Stripping Tests:

Stripping experiments were conducted using a mini-stripping column to strip loaded activated carbon fines and PS/AC beads as shown in FIG. 16. The mini elution column (MEC) was made of stainless-steel with 3 inches (7.6 cm) internal diameter and 21 inches (53.34 cm) long. The operating pressure was designed to be at about 517 kpa (75 psi) and the operating temperature was about 100° C. to about 140° C. The design pressure was about 1034 kpa (150 psi) while the design temperature was 175° C. The unit was provided with two 3 inch (7.6 cm) square socket drive plug (filter disc) with 600 micron drilled openings. A hot caustic was used to elute gold from the loaded carbon fines and PS/AC beads. The solution was heated using a boiler while keeping high pressure inside the column. The whole system was controlled through regulators and a PLC system was used to monitor the flow rate, pressure and temperature.

Figure 17:
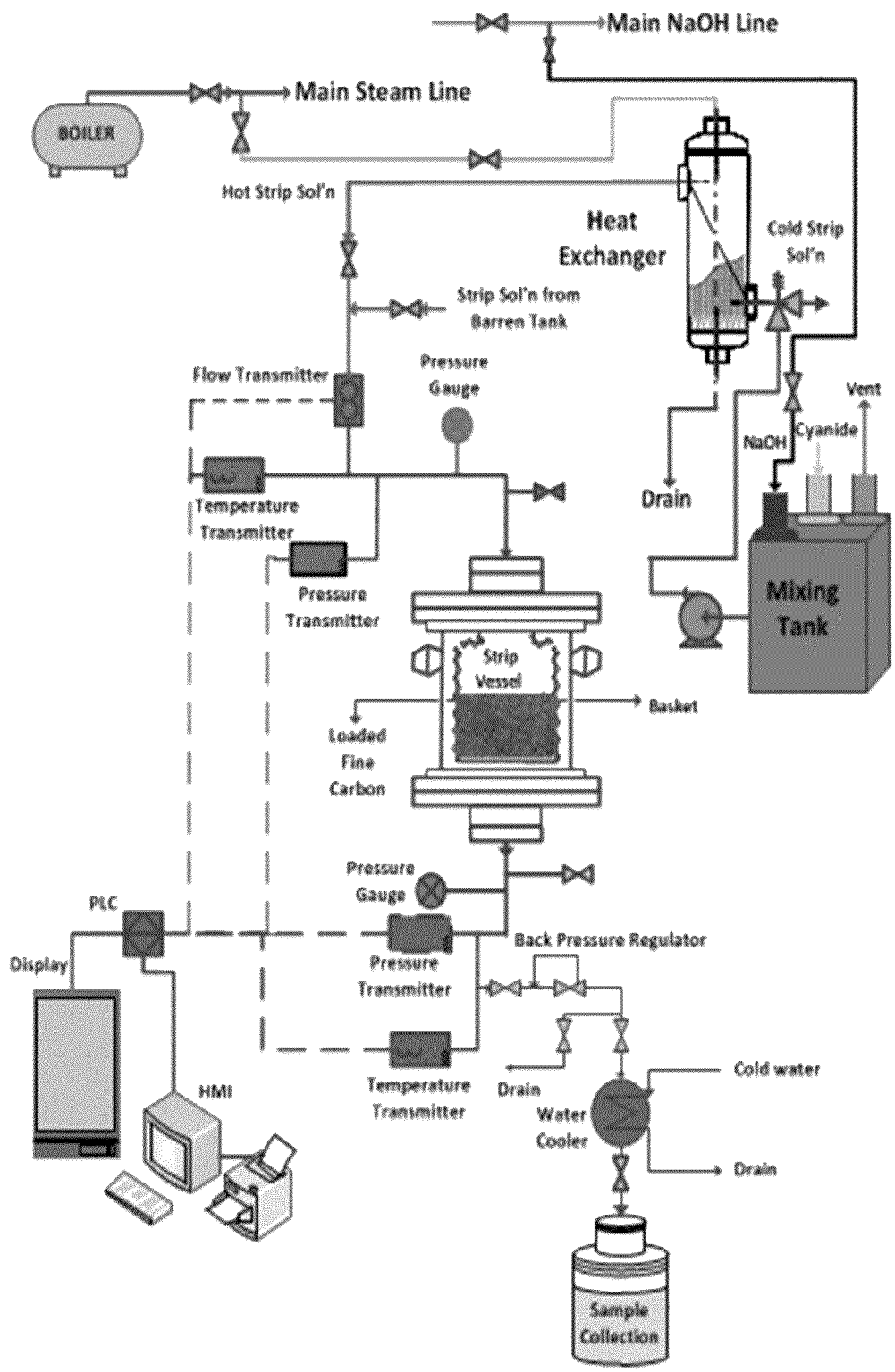
FIG. 17 shows a schematic of the mini-elution column at sampling points.

Sampling points for the feed and tails were collected on a regular basis. FIG. 17 is a schematic diagram of the elution column system. The system was designed to use the existing hot barren solution from the circuit to elute the loaded carbon samples or coated beads. The system also can switch to using a tank with a mixed desired solution to strip the carbon fine samples or the PS/AC beads. The samples collected were taken after the discharged solution was through the cooling system. All samples collected were Au assayed by FAAS as above. Analyses of the carbon and PS/AC beads for gold and other metals were also performed.

Example 1—Production of PS/AC Beads

In this example, activated carbon fines were coated onto polystyrene beads to produce PS/AC beads. This was carried out by adding about 15 grams of polystyrene beads (about 4 mm to about 4.7 mm particle size beads) with about 2 grams of activated carbon to about 400 ml of ultrapure deionized water (Barnstead RO pure LP system equipped with a Nano pure II polishing filter) in a 1 L Titanium autoclave, Parr Model 4382. The autoclave was sealed and heated to about 140° C. under constant stirring at about 1400 rpm for about 70 minutes and at a pressure of about 40 psi, using a single 4-blade impeller mounted on the end of the stirring shaft. The activated carbon fines adhered to the exterior surface of the beads and produced polystyrene activated carbon (PS/AC) beads. These beads resembled conventional ion-exchange beads.

Similar beads were produced from a full $4^2$ set of factorial experiments under the conditions outlined in the following table:

TABLE 1

The controlled factors of $4^2$ factorial design for production of carbon coated polystyrene beads

| Variable | Low level | High Level |
| --- | --- | --- |
| Temperature (° C.) | 140 | 145 |
| Ratio (w/w) | 35.5 | 42.5 |
| RPM | 1075 | 1400 |
| Time (min) | 50 | 70 |

A ratio of about 35.5 can refer to a loading the autoclave with about 70 grams of polystyrene beads and about 2 grams of fine activated carbon, while a ratio of about 42.5 can refer to about 85 grams of polystyrene beads and about 2 grams of fine activated carbon.

The results indicated that, within the ranges of variables tested, the beads produced became coated on an average of about 0.63 g of carbon per about 71 grams of polystyrene beads. Therefore, the quality of the beads produced, in terms of degree of carbon coating, was independent of production conditions, within the variable ranges tested.

Figure 4:
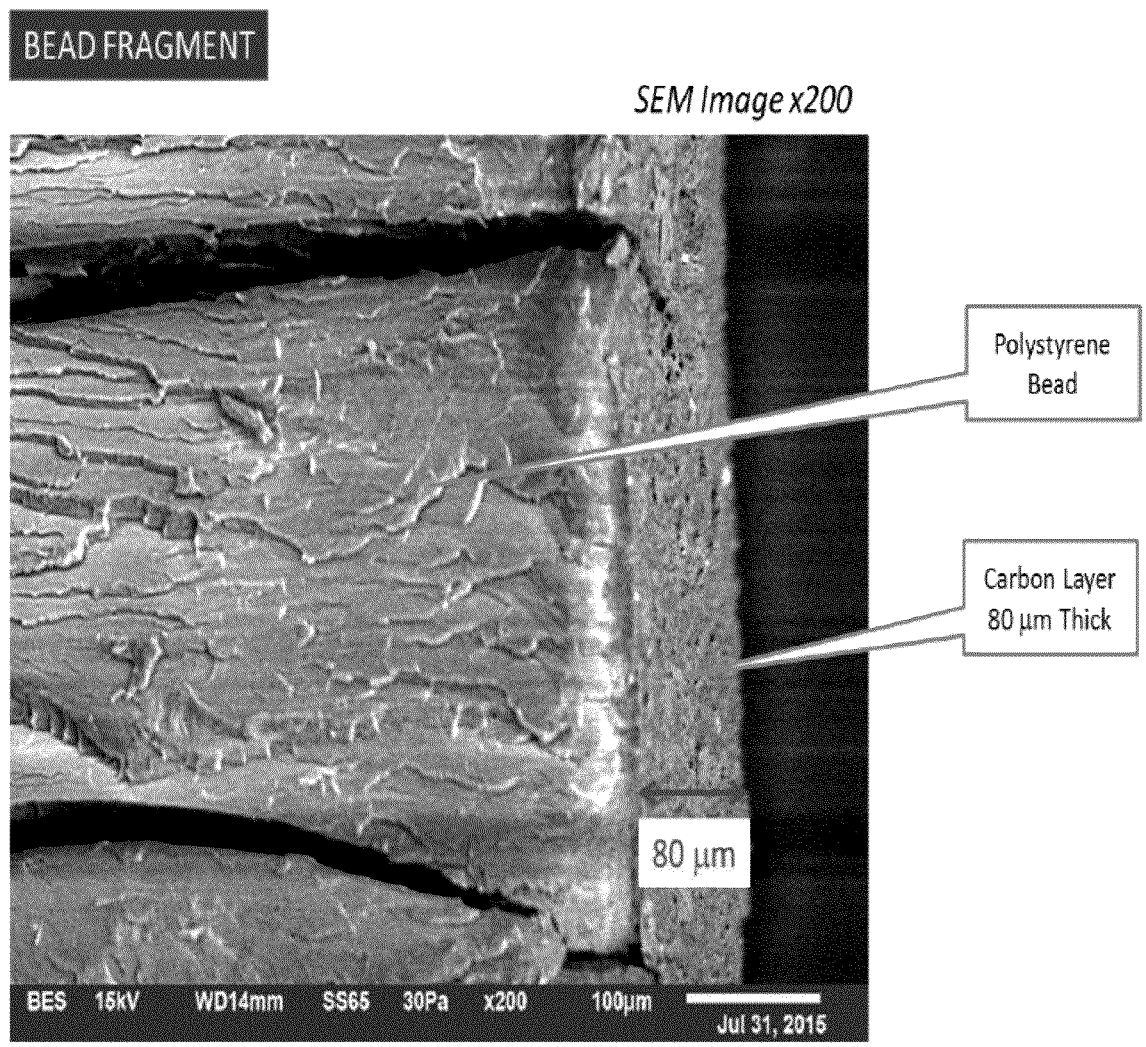
FIG. 4 shows a Scanning Electron Microscope (SEM) image (×200) of a bead fragment.
Figure 5:
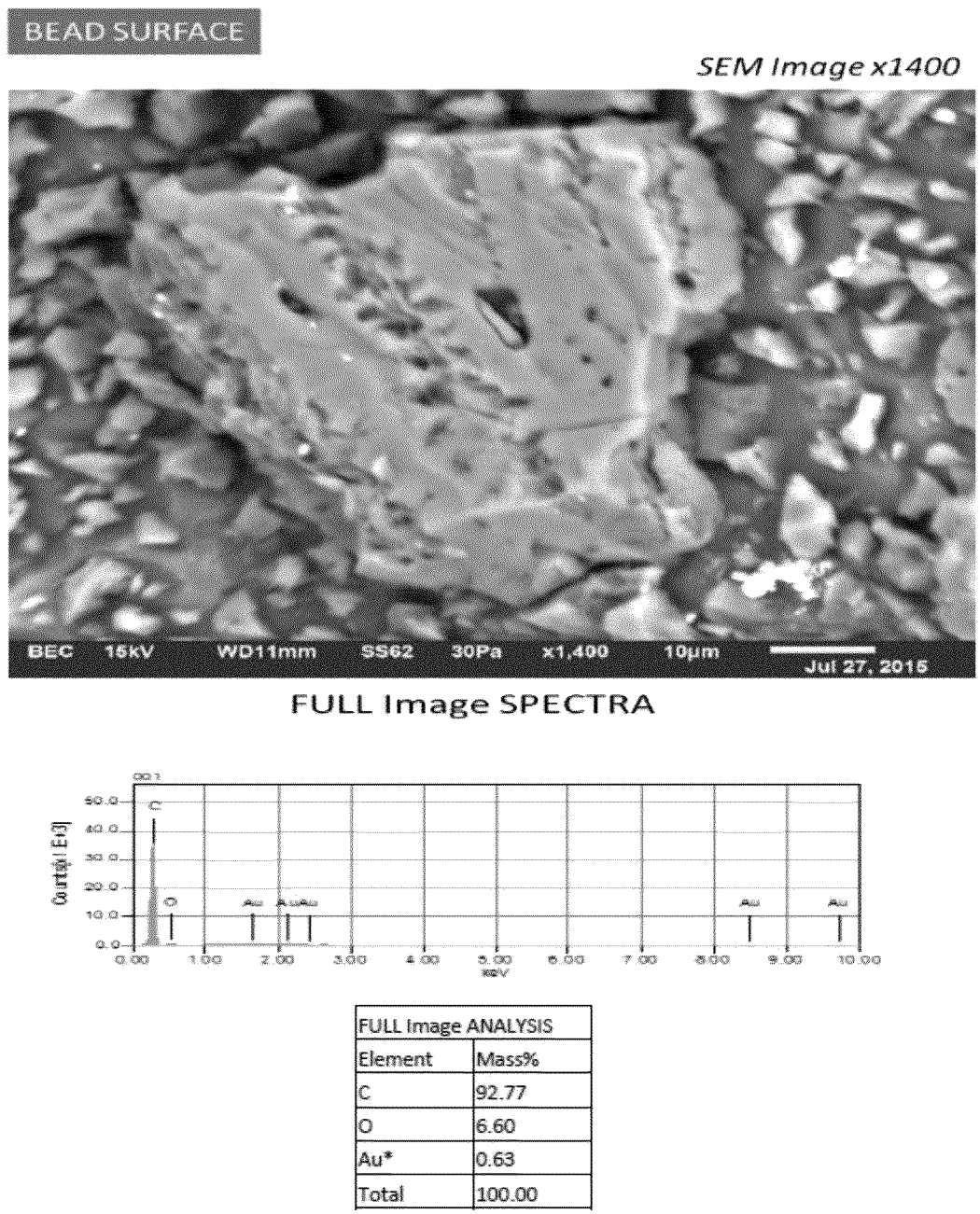
FIG. 5 shows a SEM image (×1400) of the bead surface along with full image analysis data.
Figure 6:
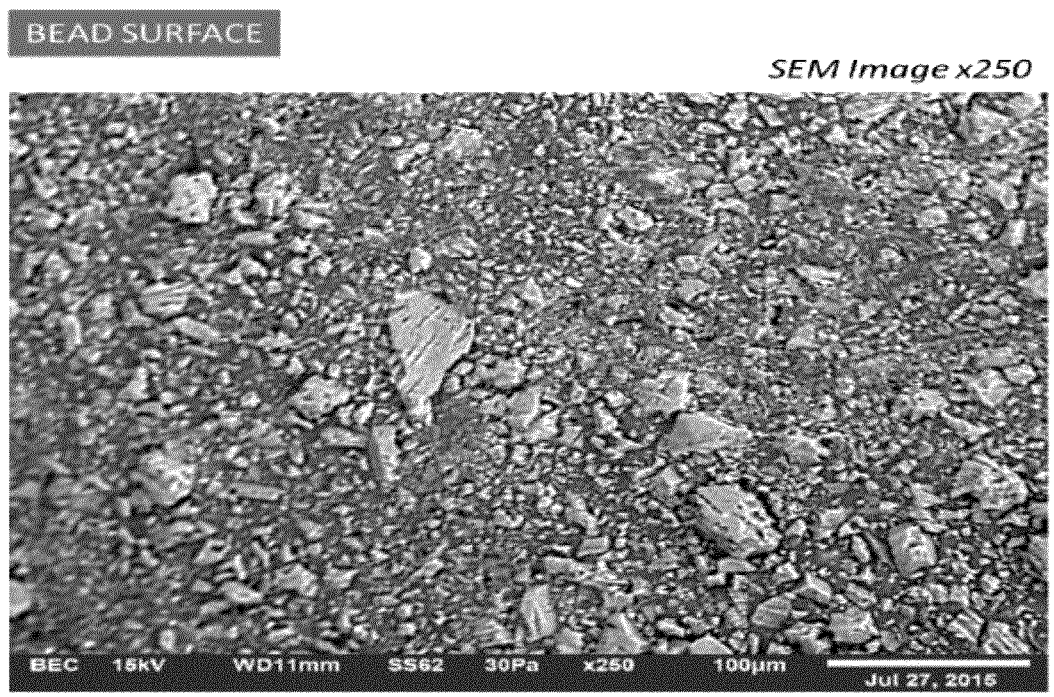
FIG. 6 shows a SEM image (×250) of the bead surface along with full image analysis data.
Figure 6:
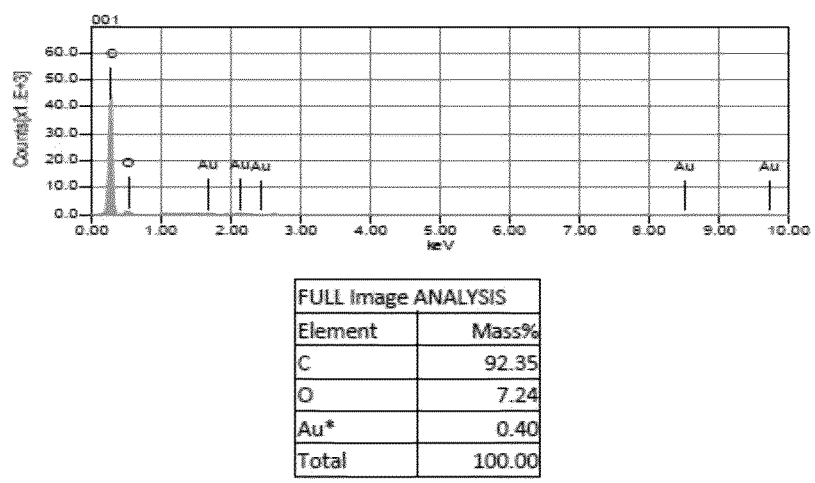
Figure 7:
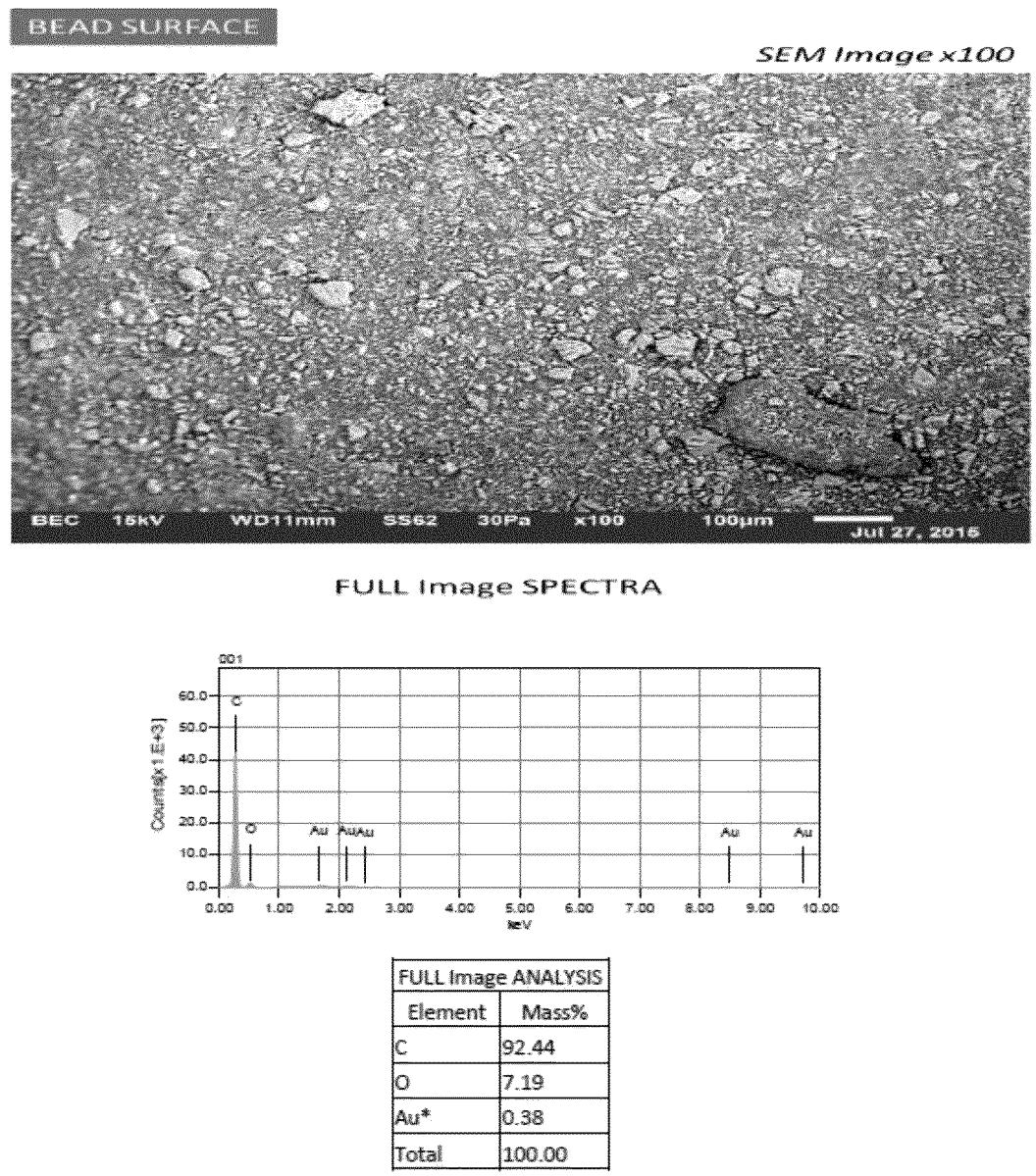
FIG. 7 shows a SEM image (×100) of the bead surface along with full image analysis data.
Figure 8:
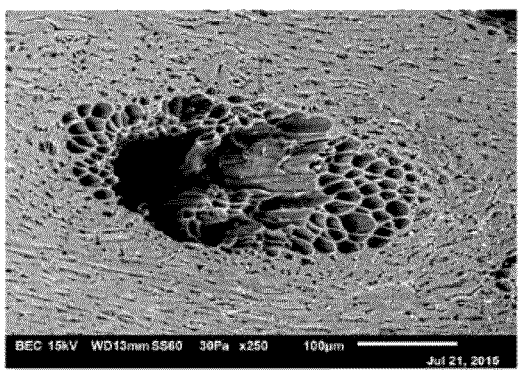
FIG. 8 shows a SEM image of fresh carbon tubular pores.
Figure 8:
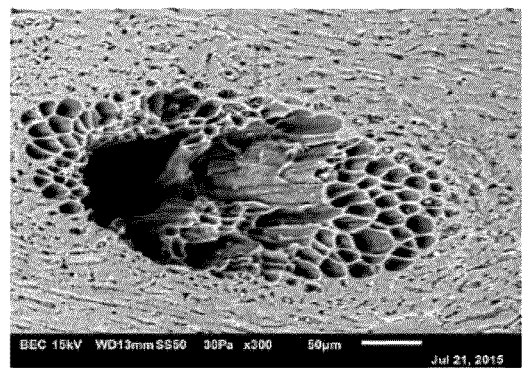
Figure 8:
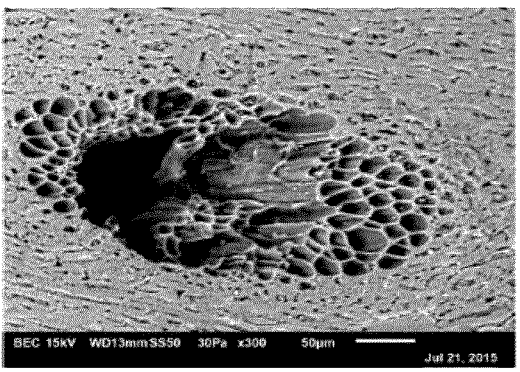
Figure 8:
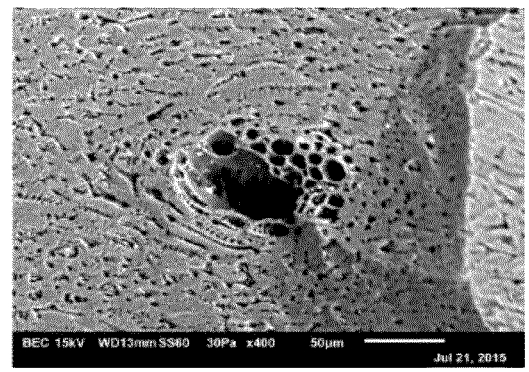
Figure 9:
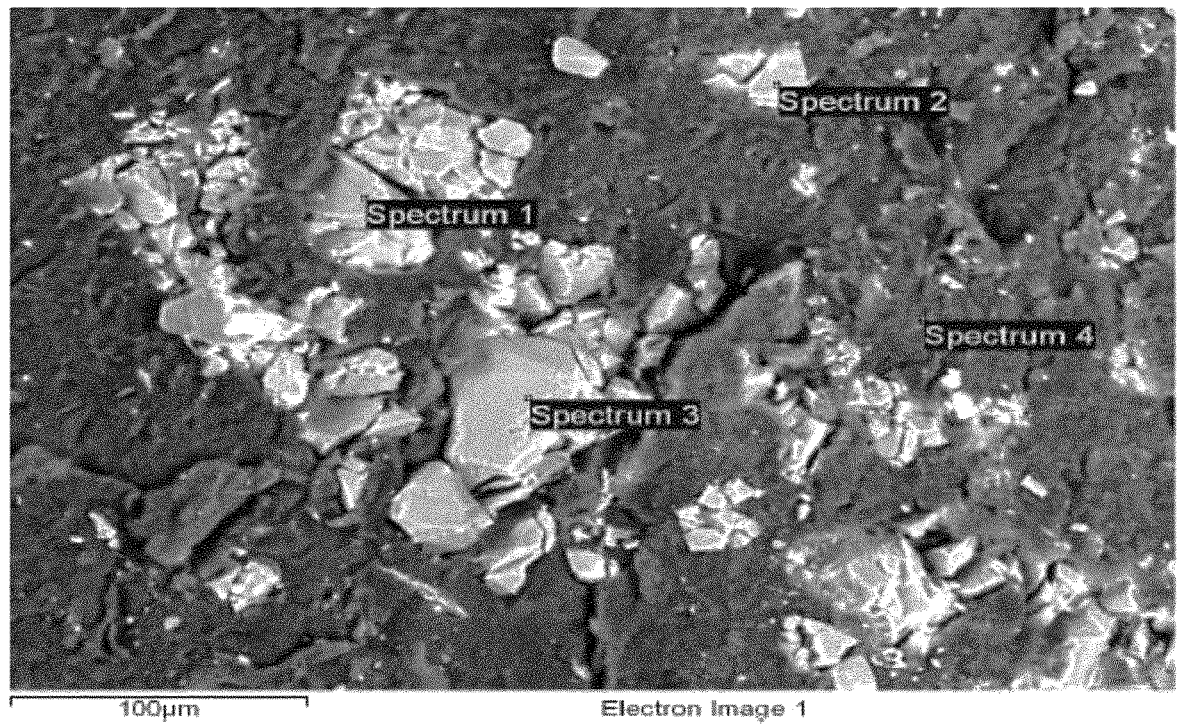
FIG. 9 shows a SEM image of silica coated PS bead along with full spectrum analysis data.

Images and analyses are also presented in FIGS. 4 to 9 for specimens of activated carbon coated beads and fresh activated carbon (for comparison). FIG. 4 shows images of the beads produced at (A) a 130° C., 30 minute sample, (B) 145° C., 30 minute sample and (C) 140° C., 1400 RPM, 70 minute sample.

Figure 10:
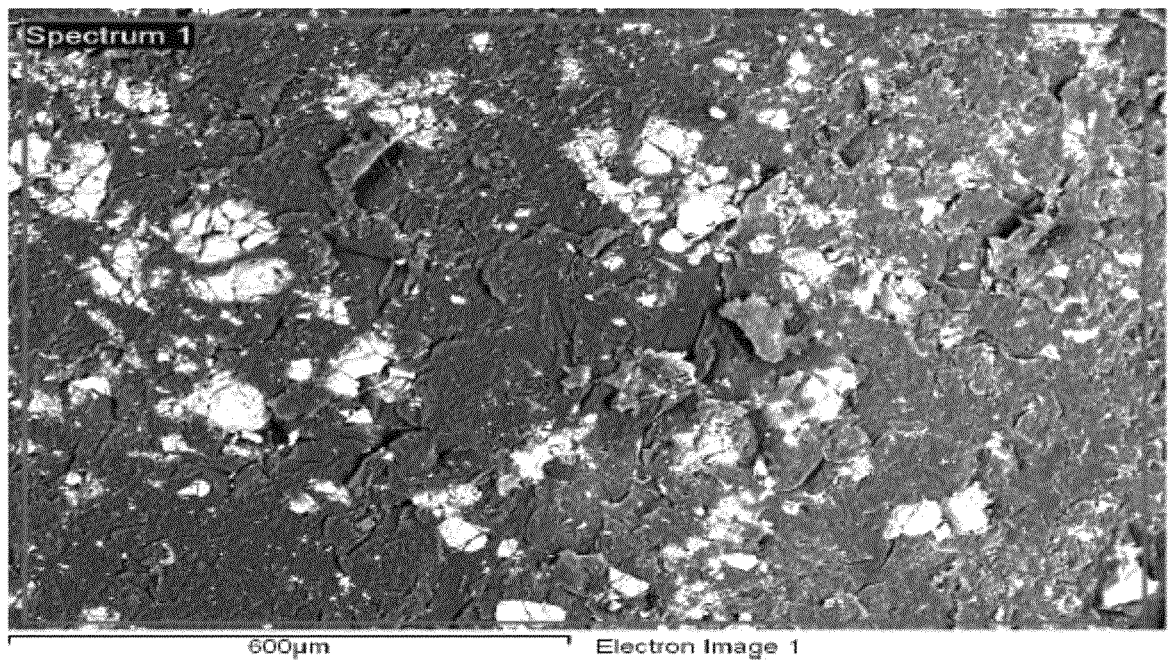
FIG. 10 shows a SEM image of silica coated polystyrene bead from Spectrum 1 along with Spectrum 1 analysis data.
Figure 11:
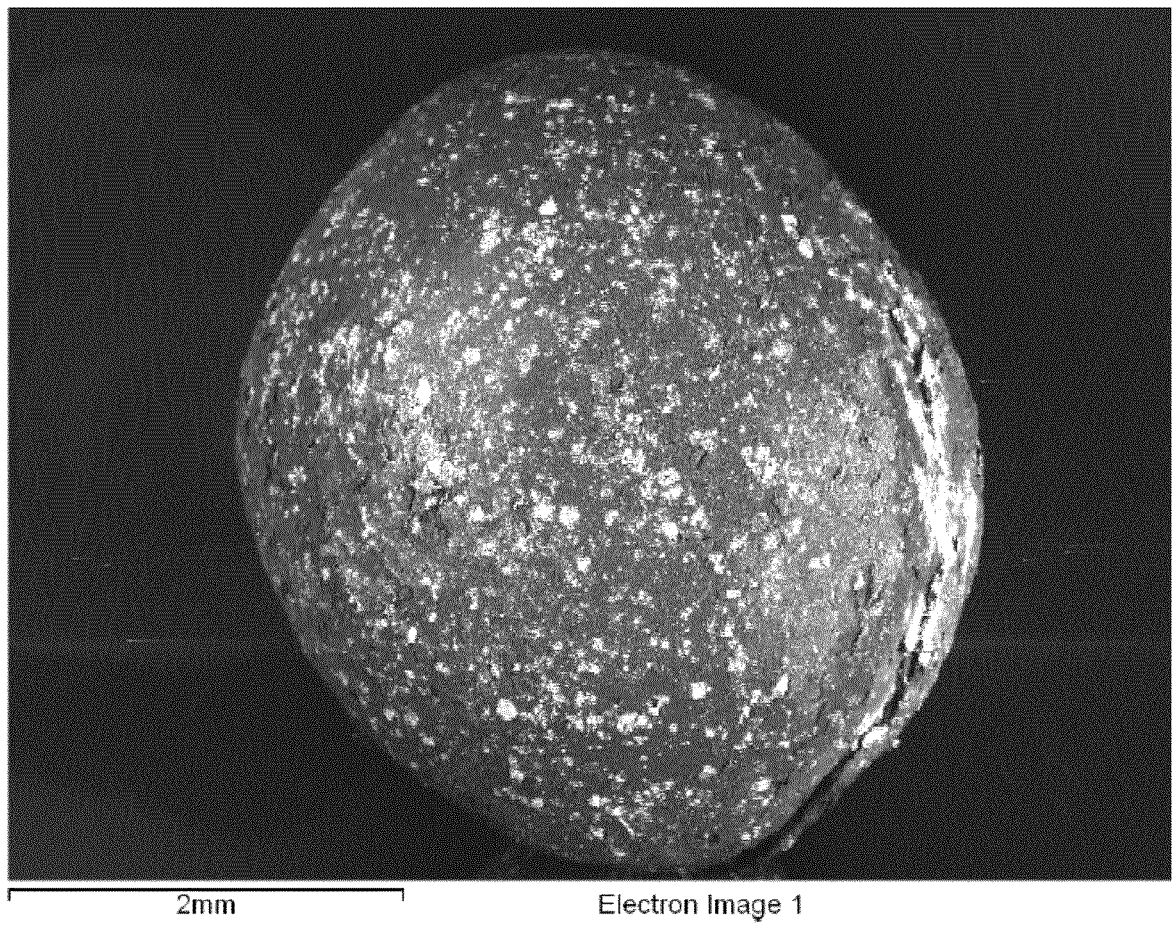
FIG. 11 shows a SEM image of silica coated polystyrene bead.
Figure 12:
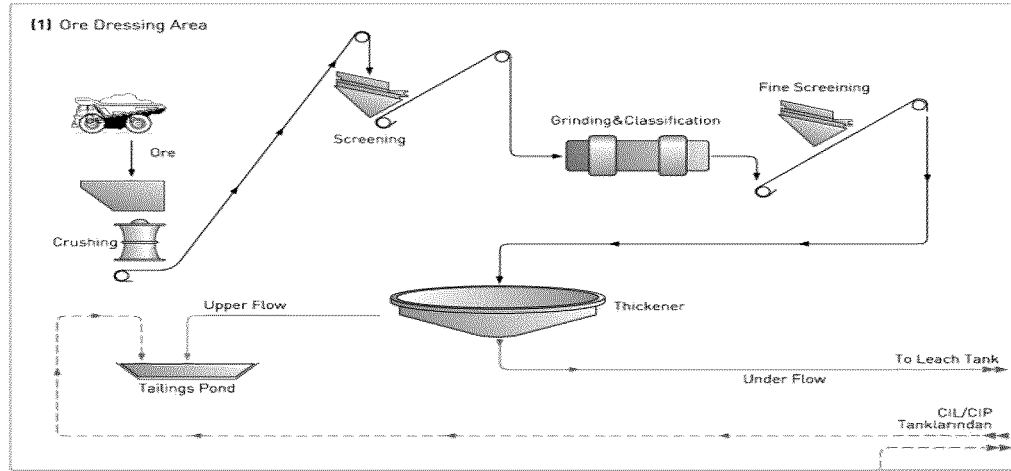
FIG. 12 shows a process flow for gold ore dressing.
Figure 13:
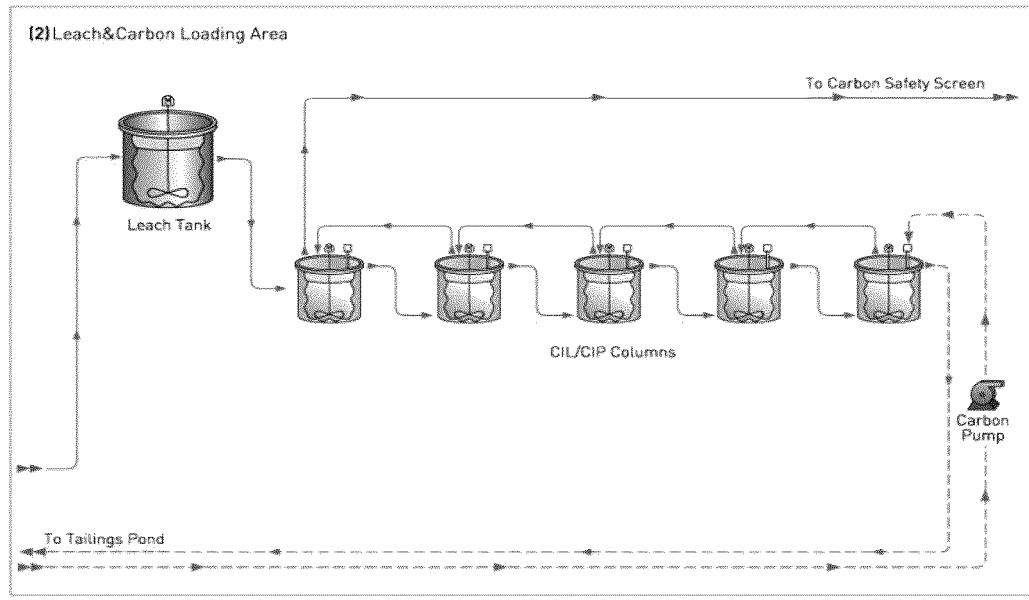
FIG. 13 shows a process flow of leach & CIP/CIL.
Figure 14:
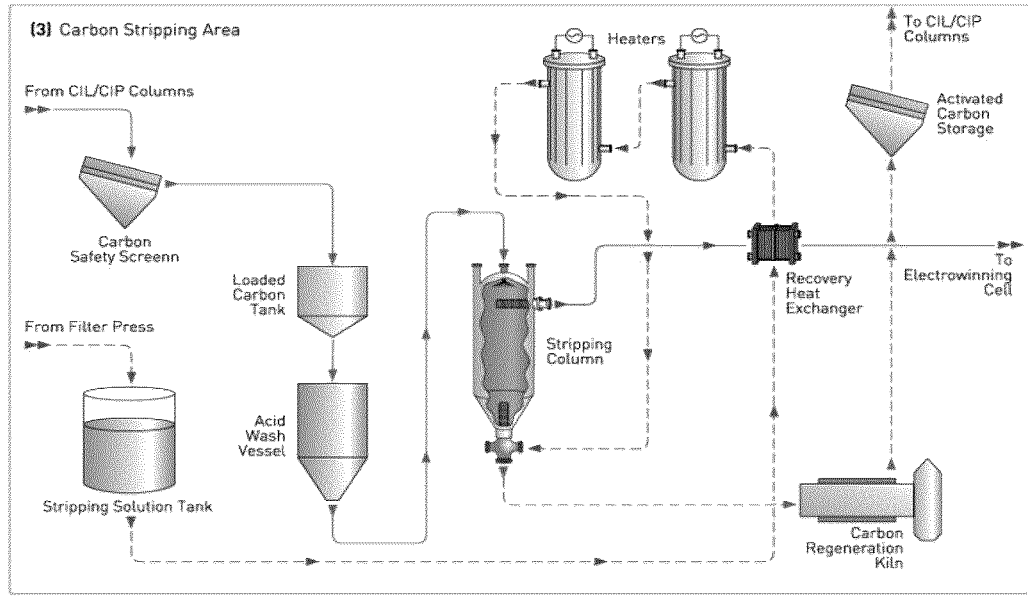
FIG. 14 shows a process flow of stripping.
Figure 15:
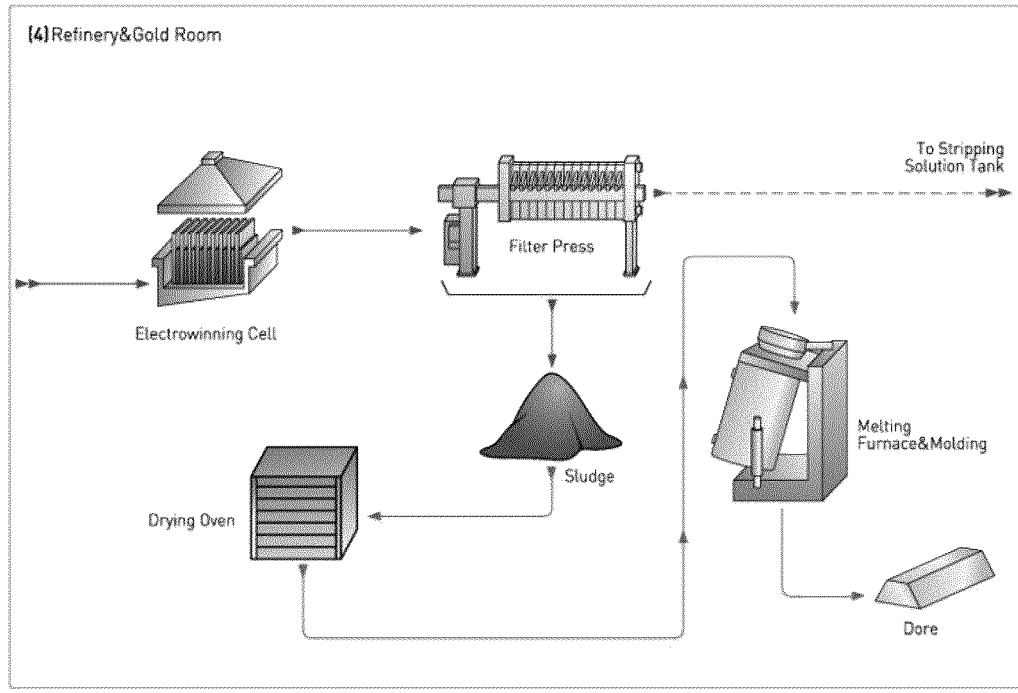
FIG. 15 shows a process flow of EW and refinery.

Similar experiments were conducted with silica coated polystyrene beads. Images of the silica coated beads are shown in FIGS. 10-12.

The methods described herein can be used to coat the core (e.g. bead) with any other adsorbent material.

Example 2—Adsorption of Gold on PS/AC Beads

In this example, samples of PS/AC beads were tested as to whether they had the ability to load gold. For testing, PS/AC beads that were formed at 140° C. in Example 1 were added to three containers containing a gold cyanide solution. Samples of the gold solution in the three containers (Samples 1-3) were analysed. The results are shown in Table 2 and in FIG. 1.

TABLE 2

Results of carbon adsorption activity tests for PS/AC Beads of Example 1

| Leach Tails Solution | | | |
| --- | --- | --- | --- |
| pH | | 10.72 | |
| [CN] (ppm) | | 350 | |
| Initial Au (g/t) | | 5.83 | |

| | Bottle ID | | |
| --- | --- | --- | --- |
| Method Description | Sample No. 1 | Sample No. 2 | Sample No. 3 |
| Mass of PS/AC beads (g) | 2.51 | 2.73 | 4.85 |
| Vol. of Solution (L) | 1 | 1 | 1 |
| Time (Minutes) | Assay (Au g/t) | | |
| 0 | 5.830 | 5.830 | 5.830 |
| 30 | 4.855 | 4.051 | 2.568 |
| 60 | 4.722 | 3.961 | 2.618 |
| 120 | 4.683 | 3.949 | 2.606 |
| 300 | 4.538 | 3.951 | 2.714 |

TABLE 2-continued

Results of carbon adsorption activity tests for PS/AC Beads of Example 1

| Time (Minutes) | Au Recovery (%) | | |
|---|---|---|---|
| 0 | 0.00 | 0.00 | 0.00 |
| 30 | 16.72 | 30.51 | 55.95 |
| 60 | 19.01 | 32.06 | 55.09 |
| 120 | 19.67 | 32.26 | 55.30 |
| 300 | 22.16 | 32.23 | 53.45 |

Figure 2:
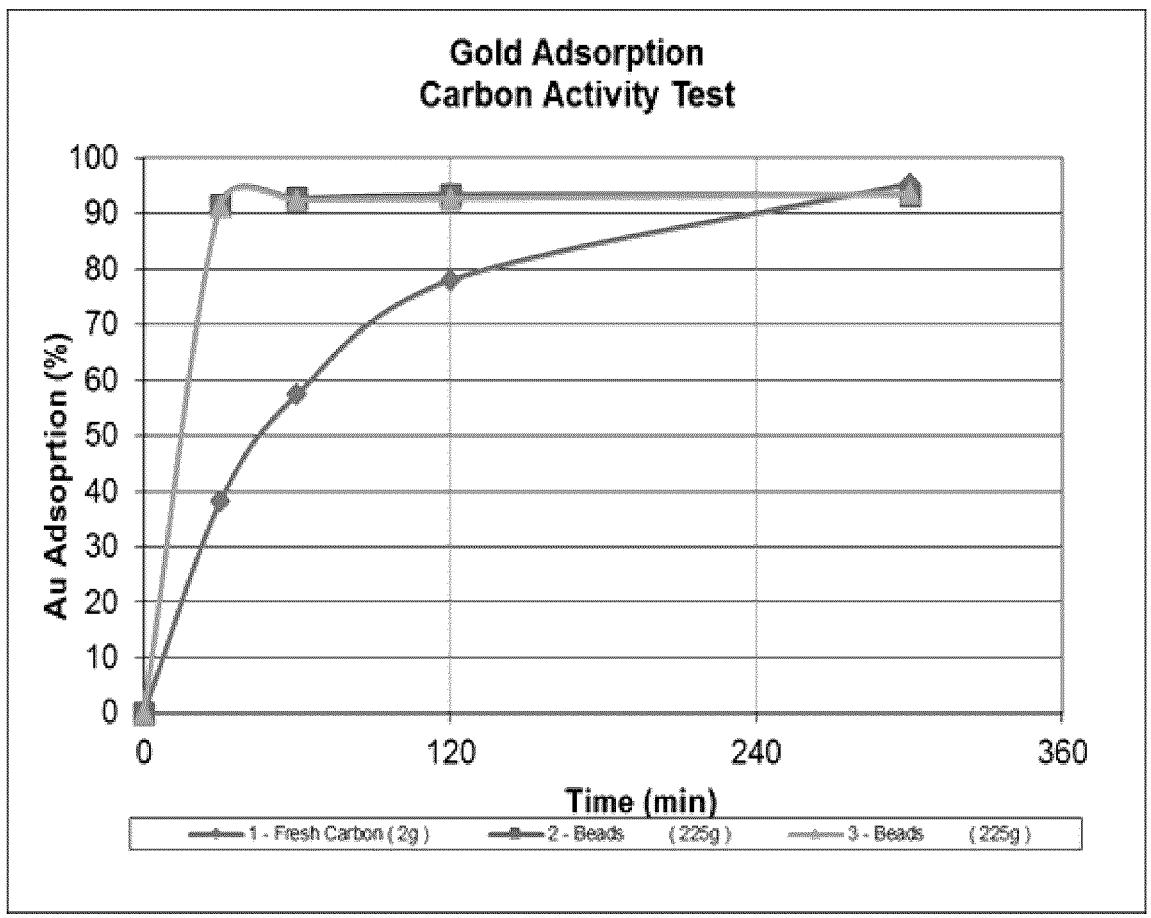
FIG. 2 shows the gold adsorption test results showing a comparison between Polystyrene (PS)/AC beads and the activated carbon alone for Example 2.
Figure 3:
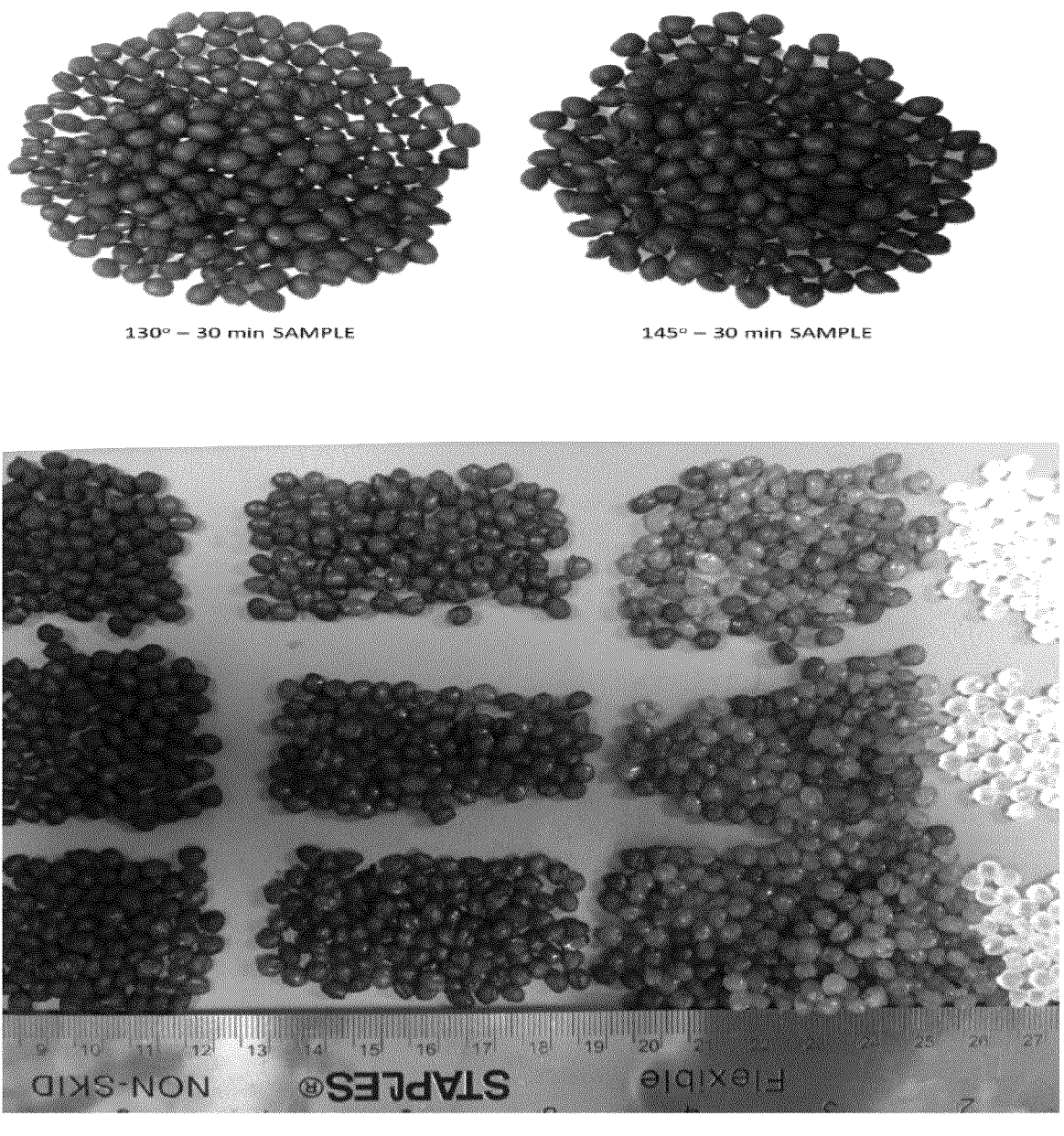
FIG. 3 shows images of the beads recovered from (A) a 130° C., 30 minute sample, (B) 145° C., 30 minute sample, and (C) 140° C., 1400 RPM, 70 minute sample of Example 4.

For comparison purposes, PS/AC beads of Example 1 were compared to activated carbon alone. Because standard "activity tests" use 2 g of carbon, in order to compare the performance of the PS/AC beads to activated carbon alone, 225 g of PS/AC beads were used in acidity tests since these beads would contain about 2 g of carbon (0.63 g per 71 grams of raw beads). The results are shown in Table 3 and in FIG. 2. The results show that the adsorption kinetics were also faster for the 225 grams of PS/AC beads compared to 2 grams of carbon.

TABLE 3

Adsorption tests comparison between PS/AC beads and the activated carbon alone
Carbon Activity Test Data Leach Tails Solution

| pH | 10.88 |
| [CN] (ppm) | 370 |
| Initial Au (g/t) | 5.207 |

| Test ID | 1 - Fresh Carbon (2 g) | 2 - Beads (225 g) | 3 - Beads (225 g) |
|---|---|---|---|
| Mass of Beads (g) | 2 | 225 | 225 |
| Vol. of Solution (L) | 1 | 1 | 1 |

| Time (Minutes) | Assay (Au g/t) | | |
|---|---|---|---|
| 0 | 5.207 | 5.207 | 5.207 |
| 30 | 3.224 | 0.450 | 0.457 |
| 60 | 2.223 | 0.383 | 0.402 |
| 120 | 1.151 | 0.348 | 0.388 |
| 300 | 0.243 | 0.344 | 0.340 |

| Time (Minutes) | Au Recovery | | |
|---|---|---|---|
| 0 | 0.00 | 0.00 | 0.00 |
| 30 | 38.08 | 91.36 | 91.22 |
| 60 | 57.31 | 92.64 | 92.28 |
| 120 | 77.90 | 93.32 | 92.55 |
| 300 | 95.33 | 93.39 | 93.47 |

Gold balance

| Test ID | 1 - Fresh Carbon (2 g) | 2 - Beads (225 g) | 3 - Beads (225 g) |
|---|---|---|---|
| Mass of Beads (g) | 2 | 225 | 225 |
| Vol. of Solution (L) | 1 | 1 | 1 |
| Final Sol'n Assay (mg/L) | 0.243 | 0.344 | 0.340 |
| Final Sol'n Gold Content (mg) | 0.243 | 0.344 | 0.340 |
| Final Bead Assay (g/t) | 2364.290 | 21.560 | 21.500 |
| Final Bead Gold Content (mg) | 4.729 | 4.851 | 4.838 |
| Initial Sol'n Assay (mg/L) | 5.207 | 5.207 | 5.207 |
| Initial Gold Content (mg) | 5.207 | 5.207 | 5.207 |
| Recovery (using beads) | 90.81% | 93.16% | 92.90% |
| Recovery (using Sol'n) | 95.33% | 93.39% | 93.47% |

Example 3—Characterization of Gold Loaded PS/AC Beads

Figure 18A:
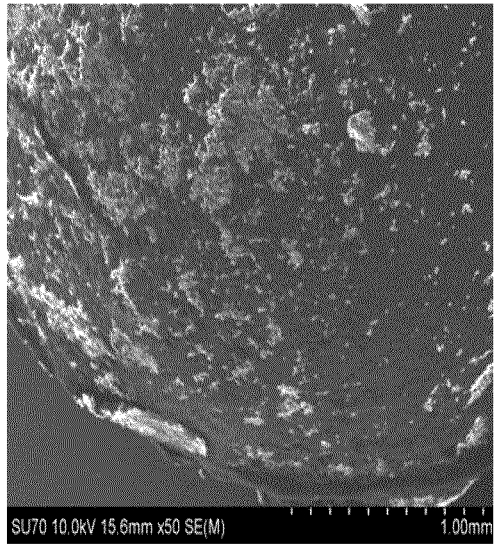
FIG. 18A-D show SEM and Energy-Dispersive X-ray Spectroscopy (EDS) analysis of gold loading on PS/AC beads.
Figure 18B:
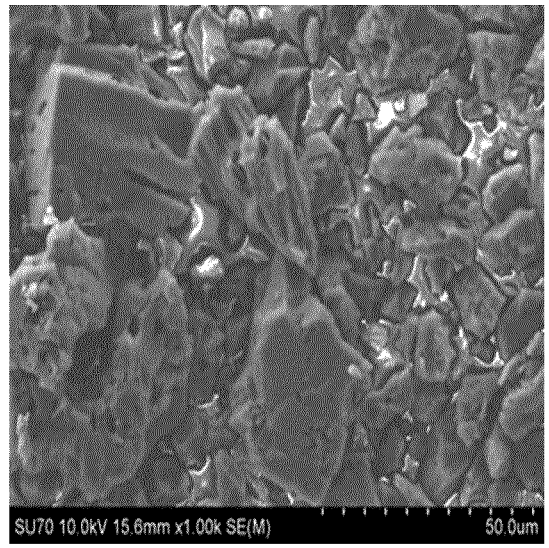
Figure 18C:
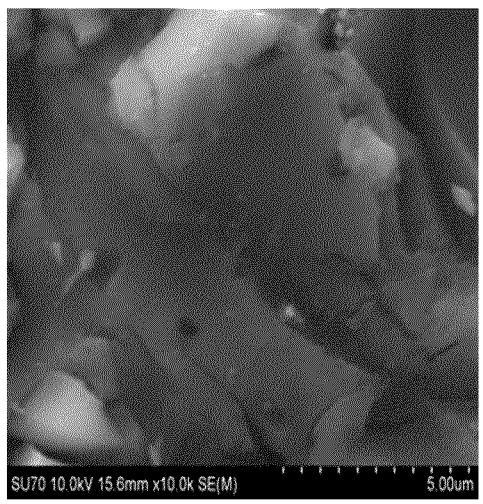
Figure 18D:
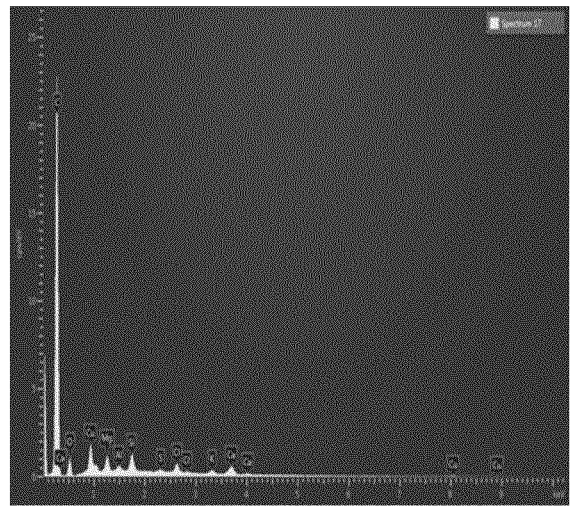

The morphology of the PS/AC beads loaded and unloaded were studied using SEM and EDS. Unloaded and loaded PS/AC bead samples were analysed by SEM and EDS. All samples were made at a ratio of about 35.5, about 140° C. under pressure for about 70 minutes at 1400 RPM and formed in the 600 ml Parr titanium autoclave. The surface structure of the PS/AC beads before and after gold adsorption was analyzed by SEM using a Hitachi Su-70 Schottky Field Emission SEM. The SEM/EDS images are shown in FIGS. 18 and 21. On all samples, several sites were selected for EDS analysis which revealed the presence of gold clusters, which confirmed the presence of gold. This was confirmed latter by ToF-SIMS surface analyses. The SEM show a smooth surface of unloaded PS/AC beads as shown in FIGS. 18A-C. The SEM micrographs for loaded PS/AC beads show particles bundled together with pores as shown in FIGS. 19A-B. The SEM micrographs for the PS/AC beads before and after gold adsorption revealed that the carbon surface is irregular with a smooth surface. FIGS. 18 and 19 show the spectra of the gold loaded PS/AC beads obtained via adsorption at room temperature and conducted with gold cyanide solution. In these spectra, gold peaks are shown.

It is to be understood that the foregoing is exemplary and explanatory only, and it is to be understood that such detail is solely for that purpose and that the invention is not limited to the disclosed embodiments, but, on the contrary, is intended to cover modifications and equivalent arrangements that are within the spirit and scope of the appended claims. As an example, it is to be understood that the present invention contemplates that, to the extent possible, one or more features of any embodiment can be combined with one or more features of any other embodiment.

All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

We claim:

1. A method of making an adsorbent composition, the method comprising:
   heating and stirring a slurry comprising cores having at least one thermoplastic material, at least one adsorbent material, and at least one solvent having a liquid,
   wherein the heating causes the cores to become tacky; and
   wherein the stirring maintains a suspension of cores and the at least one absorbent material to hinder agglomeration of the cores such that the at least one adsorbent material coats the individual cores, forming free-flowing, individually coated discrete cores.

2. The method of claim 1, wherein the core have been heated above their glass transition temperature such that they become tacky.

3. The method of claim 1, wherein at least one of the cores comprises a core having at least one of: (i) wear resistance, (ii) resistance to corrosive condition(s), and (iii) being non-porous.

4. The method of claim 1, wherein the at least one adsorbent material adheres via Van der Waals forces and/or mechanical adhesion.

5. The method of claim 1,
wherein the at least one solvent comprises inorganic and/or organic solvents capable of assisting in the adherence of the adsorbent material(s) to the cores; and/or
wherein the at least one solvent comprises at least one solvent that acts as a surfactant on the cores.

6. The method of claim 1, wherein the at least one solvent is selected from the group consisting of substituted and unsubstituted acyclic and cyclic hydrocarbons, substituted and unsubstituted acyclic and cyclic ketones, substituted and unsubstituted heterocyclics, and combinations thereof.

7. The method of claim 1, wherein the at least one solvent is heated to a temperature of about 100° C. to about 200° C.

8. The method of claim 1, wherein the method is carried out at a pressure of about 30 psi to about 50 psi.

9. The method of claim 1, wherein the heating occurs for about 50 minutes to about 70 minutes.

10. The method of claim 1, wherein the weight percentage ratios of the at least one adsorbent material to cores is about 50:50 wt/wt % to about 1:99 wt/wt % based on the total weight of the adsorbent composition.

11. The method of claim 1, wherein at least one of the cores is non-porous; or
wherein at least one of the cores is non-porous such that the at least one adsorbent material remains substantially on the surface of at least one of the cores; or
wherein at least one of the cores is non-porous such that the at least one adsorbent material does not penetrate the surface of the at least one of the cores.

12. The method of claim 1, wherein the at least one thermoplastic material comprises at least one polymer, which exhibits glass transition behaviour.

13. The method of claim 1, wherein the at least one thermoplastic material has a glass transition temperature of at least about 50° C.

14. The method of claim 12, wherein the at least one polymer is a non-cross-linked polymer.

15. The method of claim 12, wherein the at least one polymer is a cross-linked polymer.

16. The method of claim 15, wherein the cross-linked polymer has a degree of cross-linking of at most 20 mol %.

17. The method of claim 15, wherein the cross-linked polymer is a polymer that has been cross-linked using a cross-linking agent selected from the group consisting of divinyl benzene, divinyl toluene, dimethyl divinyl benzene, dimethyl divinyl toluene, trivinyl benzene, trivinyl napthalene, ethyl acrylate, vinyl acetate, and combinations thereof.

18. The method of claim 12, wherein the at least one thermoplastic material becomes tacky when heated above its glass transition temperature.

19. The method of claim 1, wherein at least one of the cores a pellet and/or bead.

20. The method of claim 1, wherein the cores have an average particle size greater than about 1 mm.

21. The method of claim 1, wherein the at least one adsorbent material is at least one coat, whereby the coverage ranges from about 10% of the surface area of one of the cores to about 100% of the surface area of the one core.

22. The method of claim 1, wherein the at least one adsorbent material comprises a material for adsorbing metal(s) and/or metal ions.

23. The method of claim 22, wherein the metal(s) and/or metal ions are selected from the group consisting of precious metals, precious metal ions, transition metals, transition metal ions, rare-earth metals and rare-earth metal ions.

24. The method of claim 1, wherein the at least one adsorbent material comprises at least one non-metal material.

25. The method of claim 1, wherein the at least one adsorbent material comprises at least one metal oxide material.

26. The method of claim 1, wherein the at least one adsorbent material is selected from the group consisting of carbon, activated carbon, molecular sieve carbon, silica, activated silica, alumina, activated alumina, zeolites, molecular sieve zeolites, and combinations thereof.

27. The method of claim 1, wherein the at least one adsorbent material is porous;
wherein the at least one adsorbent material has average pore diameter of about 0.1 nm to about 30 nm; and/or
wherein the at least one adsorbent material has a surface area of about 50 m$^2$/g to about 2000 m$^2$/g.

28. The method of claim 1, wherein the amount of the cores are greater than about 50 wt % based on the total weight of the adsorbent composition.

29. The method of claim 1, wherein the amount of the at least one adsorbent material is less than about 50 wt % based on the total weight of the adsorbent composition.

30. The method of claim 1, wherein the individually coated cores are particles.

31. The method of claim 30, wherein the particles have an average particle size greater than about 1 mm.

32. The method of claim 1, wherein the method excludes the use of binder(s).

33. The method of claim 1, wherein the at least one solvent is selected from the group consisting of acetone, ethyl acetate, methylene chloride, dichloroethane, cyclohexanone, methyl ethyl ketone, methyl benzene, tetrahydrofuran, and combinations thereof.

34. The method of claim 1, wherein the at least one solvent comprises water.

35. The method of claim 1, wherein the at least one solvent is heated to a temperature of about 120° C. to about 200° C.

36. The method of claim 1, wherein the at least one solvent is heated to a temperature of about 120° C. to about 150° C.

37. The method of claim 1, wherein the at least one solvent is heated to a temperature of about 140° C. to about 145° C.

38. The method of claim 1, wherein the method is carried out at a pressure is about 40 psi to about 50 psi.

39. The method of claim 1, wherein the heating occurs for about 50 minutes to about 60 minutes.

40. The method of claim 1, wherein the weight percentage ratios of the at least one adsorbent material to cores is about 1:99 wt/wt % to about 40:60 wt/wt % based on the total weight of the adsorbent composition.

41. The method of claim 1, wherein the weight percentage ratios of the at least one adsorbent material to cores is about 5:95 wt/wt % to about 30:70 wt/wt % based on the total weight of the adsorbent composition.

42. The method of claim 1, wherein the weight percentage ratios of the at least one adsorbent material to cores is about 1:90 wt/wt % to about 20:80 wt/wt % based on the total weight of the adsorbent composition.

43. The method of claim 1, wherein the at least one thermoplastic material has a glass transition temperature of at least about 70° C.

44. The method of claim 1, wherein the at least one thermoplastic material has a glass transition temperature of from about 100° C. to about 200° C.

45. The method of claim 1, wherein the at least cross-linked polymer has a degree of cross-linking to make the cores harder and more wear resistant.

46. The method of claim 1, wherein the cross-linked polymer has a degree of cross-linking of at most 10 mol %.

47. The method of claim 1, wherein the cross-linked polymer has a degree of cross-linking of at most 5 mol %.

48. The method of claim 1, wherein the cross-linked polymer has a degree of cross-linking of at most 1 mol %.

49. The method of claim 1, wherein the slurry is a suspension.

50. The method of claim 1, wherein the individually coated cores have least one coat that covers the surface area of the cores.

51. The method of claim 1, wherein the solvent is continually agitated for a about 40 minutes to about 80 minutes.

52. The method of claim 12, wherein the at least one polymer is selected from the group consisting of polystyrene, polyethylene, poly(methyl methacrylate), polyvinyl chloride, polyamides, polyacrylonitrile butadiene styrene, polyacrylonitrile, polycarbonates, polyphenylene sulfide, polyether sulfone, polyphenylene oxide, nylon, polylactic acid, polytetrafluoroethylene, polyethylene terephthalate, polypropylene terephthalate, and combinations thereof.

53. The method of claim 12, wherein the at least one polymer comprises polystyrene.

54. The method of claim 15, wherein the cross-linked polymer comprises polystyrene crosslinked with divinyl benzene.

55. The method of claim 15, wherein the cross-linked polymer comprises at least about 50% of one polymer.

56. The method of claim 15, wherein the cross-linked polymer comprises at least about 70% of one polymer.

57. The method of claim 15, wherein the cross-linked polymer comprises at least about 80% of one polymer.

58. The method of claim 15, wherein the cross-linked polymer comprises at least about 99% of one polymer.

59. The method of claim 1, wherein the cores have an average particle size greater than about 2 mm.

60. The method of claim 1, wherein the cores have an average particle size of from about 2 mm to about 60 mm.

61. The method of claim 22, wherein the metal(s) and/or metal ions is a metal selected from the group consisting of gold, silver, rhenium, ruthenium, rhodium, palladium, osmium, iridium, platinum, copper, nickel and combinations thereof.

62. The method of claim 22, wherein the metal(s) and/or metal ions is a metal, and the metal is gold, silver, platinum, copper, and/or nickel.

63. The method of claim 22, wherein the metal(s) and/or metal ions is a metal, and the metal is gold.

64. The method of claim 1, wherein the at least one adsorbent material comprises carbon.

65. The method of claim 1, wherein the at least one adsorbent material comprises activated carbon.

66. The method of claim 1, wherein the at least one adsorbent material comprises metal oxide(s).

67. The method of claim 1, wherein the at least one adsorbent material comprises metal oxide(s) selected from the group consisting of silica, alumina, and combinations thereof.

68. The method of claim 1, wherein the amount of the cores is about 99 wt % to about 80 wt % based on the total weight of the adsorbent composition.

69. The method of claim 1, wherein the amount of the at least one adsorbent material is about 1 wt % to about 20 wt % based on the total weight of the adsorbent composition.

70. The method of claim 30, wherein the at least one particle has an average particle size of about 3 mm and about 70 mm.

* * * * *